United States Patent
Fladhammer et al.

(10) Patent No.: US 11,161,449 B2
(45) Date of Patent: Nov. 2, 2021

(54) ADJUSTER GEAR SCREW

(71) Applicant: Asyst Technologies, LLC, Kenosha, WI (US)

(72) Inventors: Scott T. Fladhammer, Caledonia, WI (US); Michael B. Grimm, Antioch, IL (US)

(73) Assignee: Asyst Technologies L.L.C., Kenosha, WI (US)

( * ) Notice: Subject to any disclaimer, the term of this patent is extended or adjusted under 35 U.S.C. 154(b) by 66 days.

(21) Appl. No.: 16/585,702

(22) Filed: Sep. 27, 2019

(65) Prior Publication Data

US 2020/0114804 A1    Apr. 16, 2020

Related U.S. Application Data

(60) Provisional application No. 62/744,196, filed on Oct. 11, 2018.

(51) Int. Cl.
| | |
|---|---|
| *B60Q 1/068* | (2006.01) |
| *F21S 41/675* | (2018.01) |
| *F16H 25/24* | (2006.01) |

(52) U.S. Cl.
CPC ........... *B60Q 1/0683* (2013.01); *F16H 25/24* (2013.01); *F21S 41/675* (2018.01); *B60Q 2200/30* (2013.01)

(58) Field of Classification Search
CPC . B60Q 1/0683; B60Q 2200/30; F21S 41/675; F16H 25/24

(Continued)

(56) References Cited

U.S. PATENT DOCUMENTS

| | | |
|---|---|---|
| 6,257,747 B1 | 7/2001 | Burton |
| 6,871,989 B2 | 3/2005 | Nakazawa et al. |

(Continued)

FOREIGN PATENT DOCUMENTS

| | | |
|---|---|---|
| DE | 10052129 | 5/2001 |
| EP | 1946966 | 4/2009 |

(Continued)

OTHER PUBLICATIONS

European Office Action dated Oct. 8, 2020 for EP Application No. 19201219.3.

(Continued)

*Primary Examiner* — Elmito Breval
*Assistant Examiner* — Hana S Featherly
(74) *Attorney, Agent, or Firm* — James Joyce; Godfrey & Kahn, S.C.

(57) ABSTRACT

An adjuster gear screw is provided that includes an adjuster shaft having a threaded portion and a shaft end, a gear head having a plurality of radial protrusions spaced by a plurality of radial indents, and a flange having a flange front surface, an elongated neck interconnecting the adjuster shaft and the gear head, and a gear having a gear rear surface, a plurality of teeth, and a plurality of fingers and notches extending along an inner circumference, wherein the gear is axially secured to the gear head in a first longitudinal direction via abutment of the gear rear surface with the flange front surface, and in a second longitudinal direction via engagement of the plurality of fingers with the plurality of indents, and wherein the gear is rotationally secured to the gear head via abutment of the plurality of radial protrusions with the plurality of notches.

15 Claims, 18 Drawing Sheets

(58) Field of Classification Search
USPC .......................................................... 362/514
See application file for complete search history.

(56) References Cited

U.S. PATENT DOCUMENTS

| | | | |
|---|---|---|---|
| 7,052,164 B2 | 5/2006 | Burton | |
| 8,944,652 B2 | 2/2015 | Tachiiwa | |
| 2005/0145050 A1* | 7/2005 | Fladhammer | B60Q 1/0683 |
| | | | 74/318 |
| 2007/0109805 A1 | 5/2007 | Whynott | |
| 2015/0158415 A1 | 6/2015 | Dürkopp | |

FOREIGN PATENT DOCUMENTS

| | | |
|---|---|---|
| ER | 1675751 | 12/2010 |
| JP | 07328883 | 12/1995 |
| JP | H09161506 | 6/1997 |
| JP | 10078100 | 3/1998 |
| JP | 2011243520 | 12/2011 |
| WO | 2013064164 | 5/2013 |

OTHER PUBLICATIONS

European Search Report for Application No. 19201219.3 dated Apr. 15, 2020.
Extended European Report dated Apr. 21, 2021 for EP Application No. 21154873.0.
Chinese Office Action for Application No. 2019109613475 dated Aug. 9, 2021.

* cited by examiner

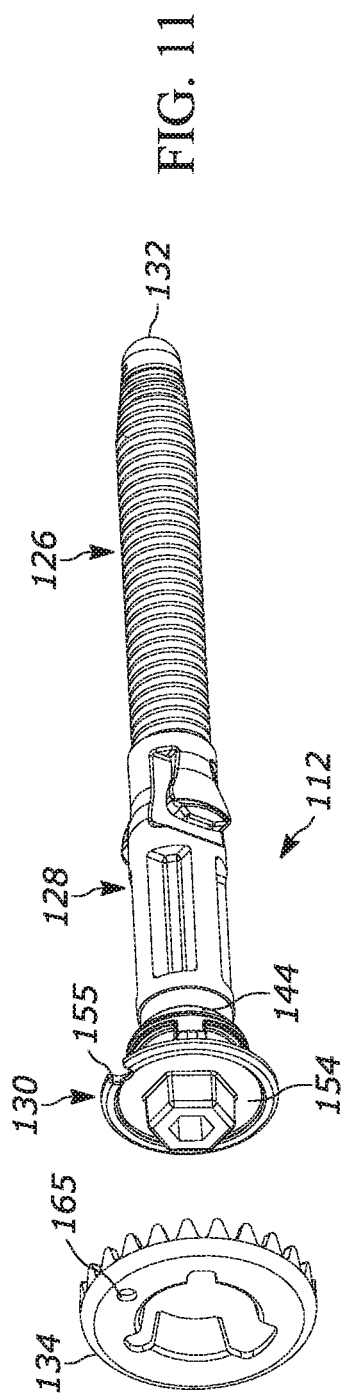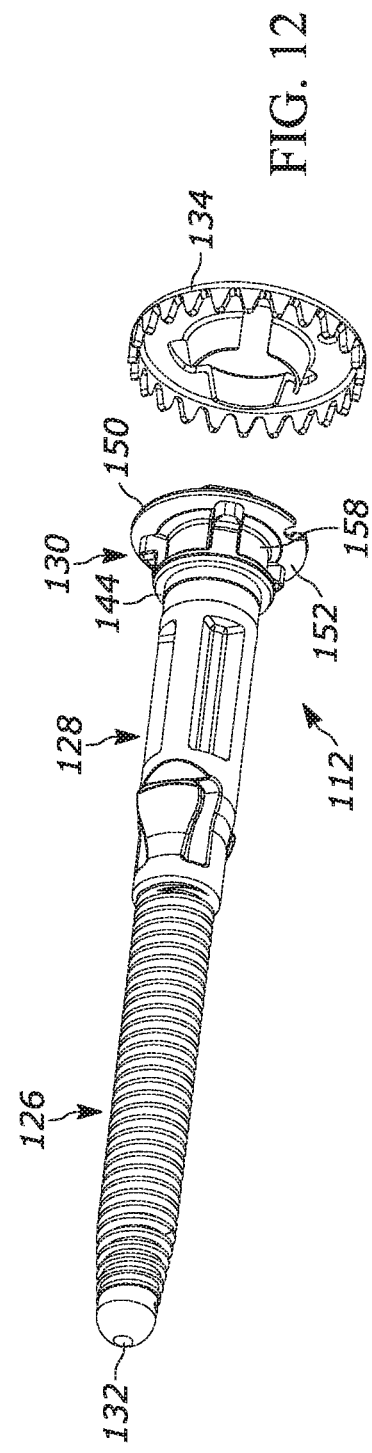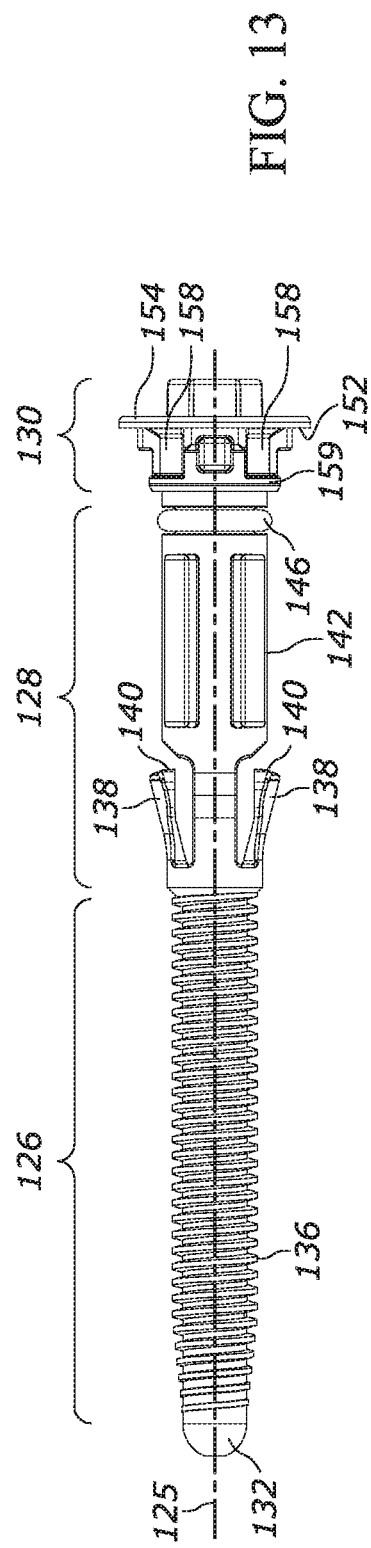

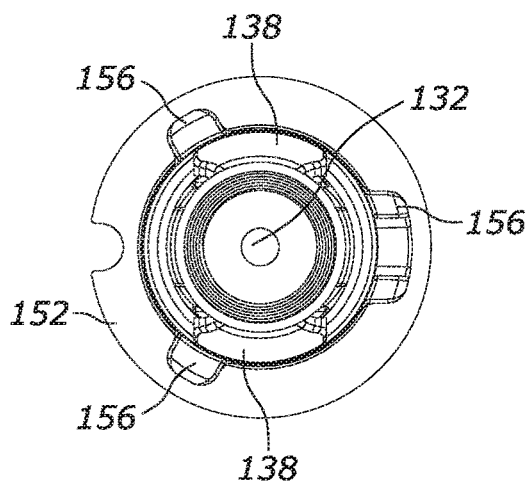
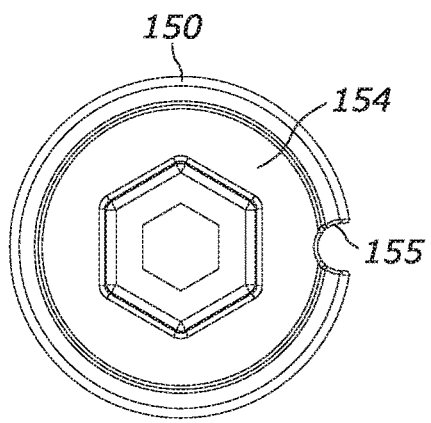
FIG. 17  FIG. 18
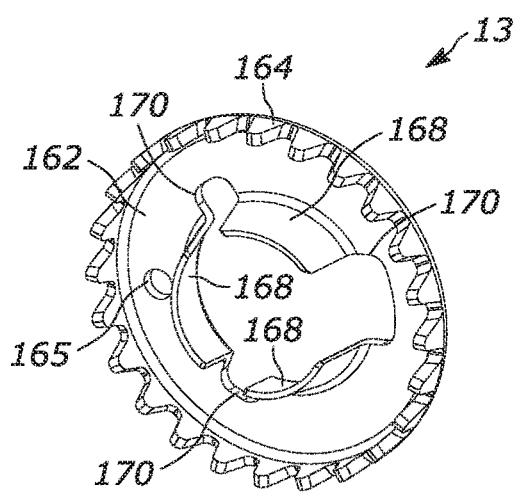
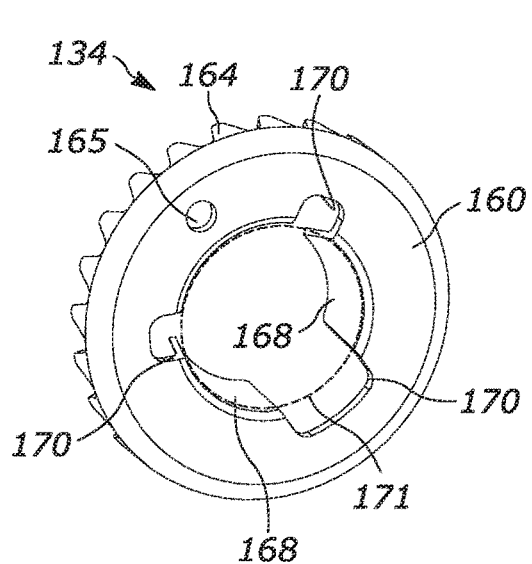
FIG. 19  FIG. 20
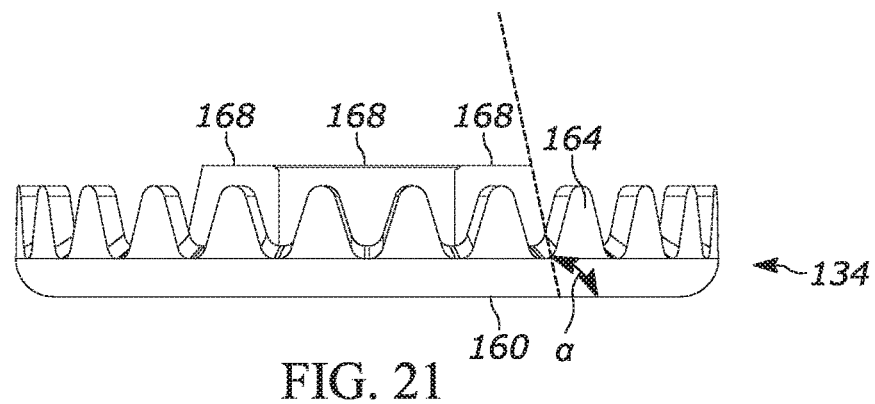
FIG. 21

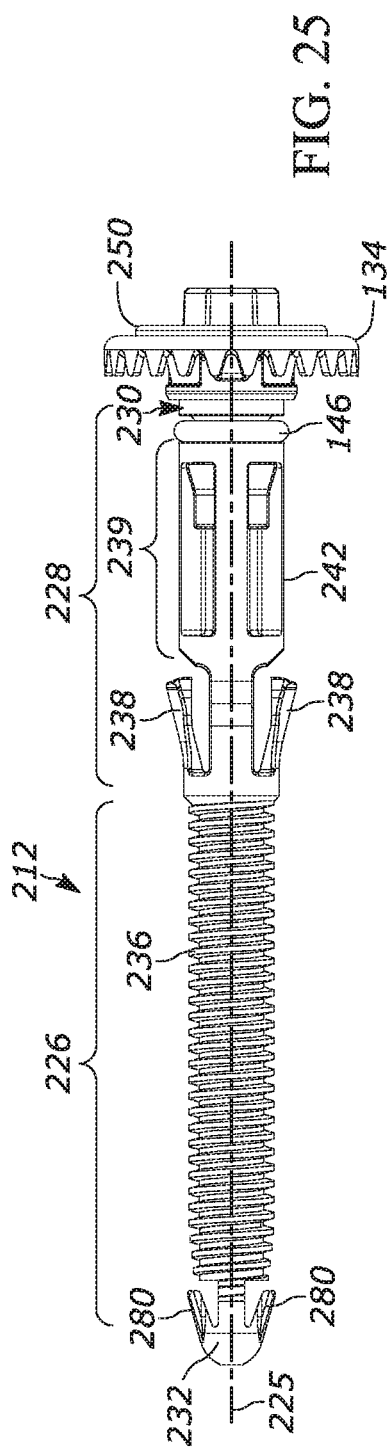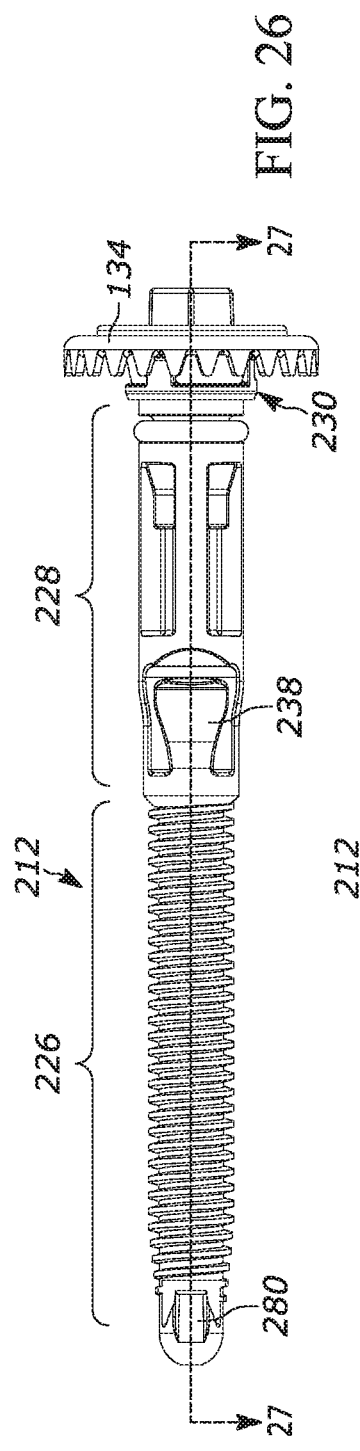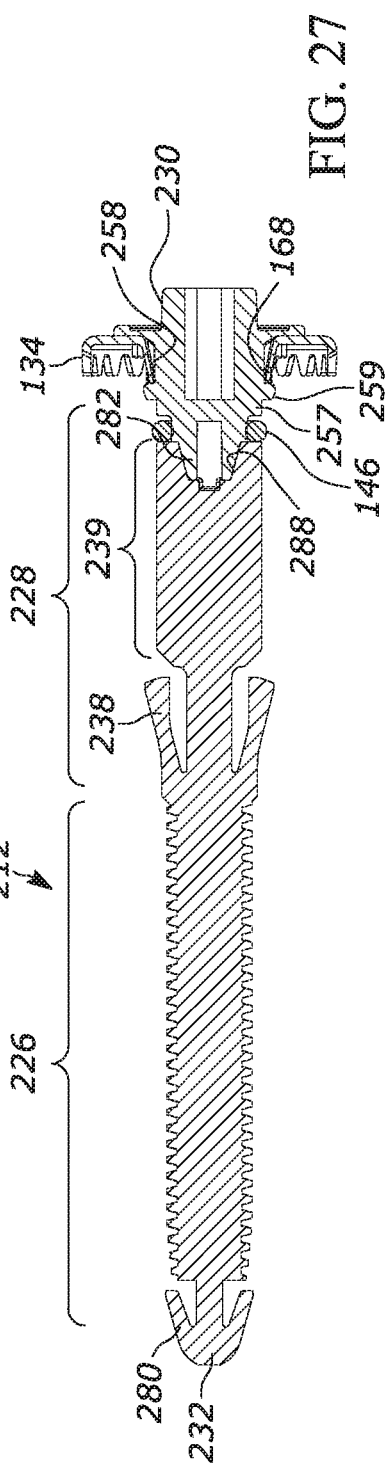

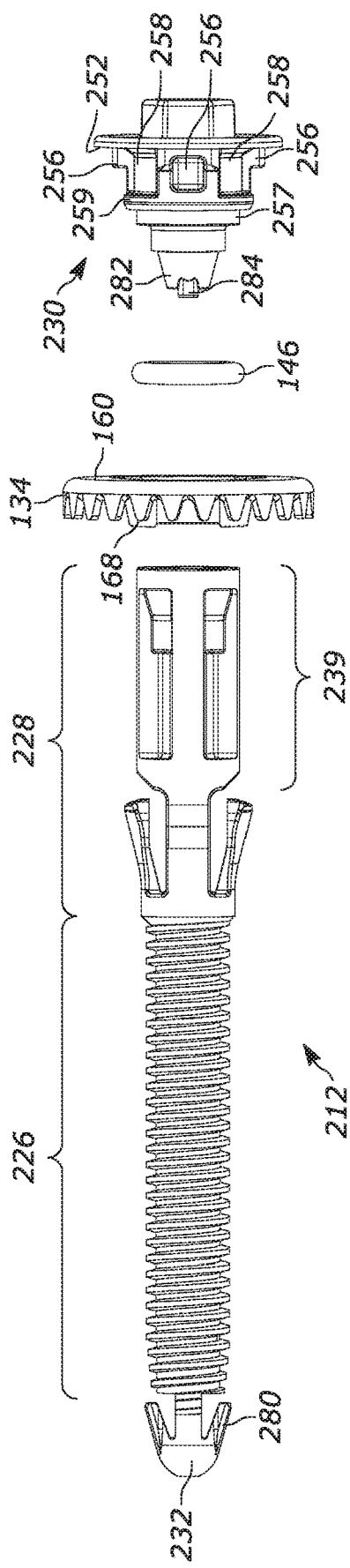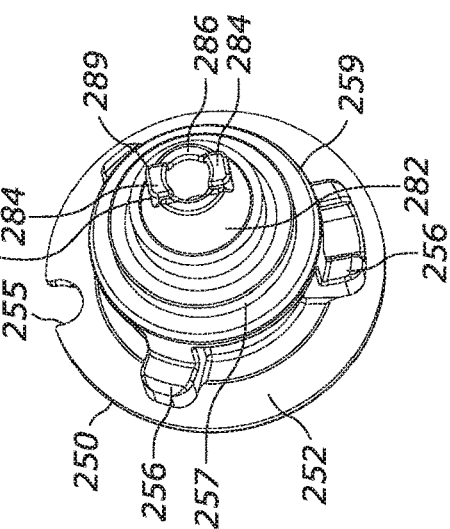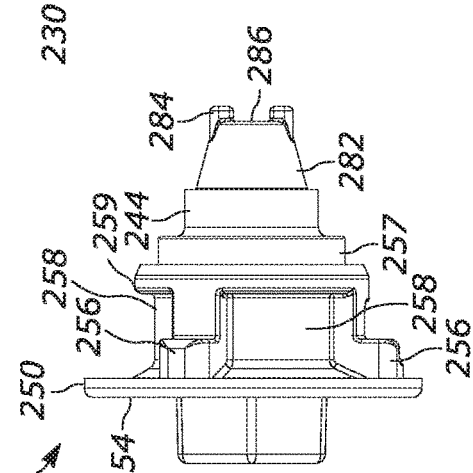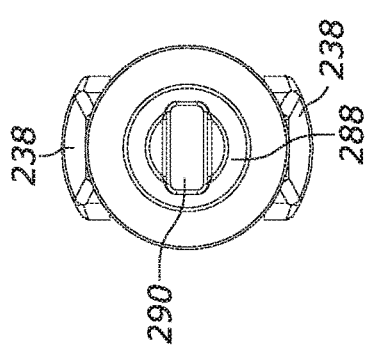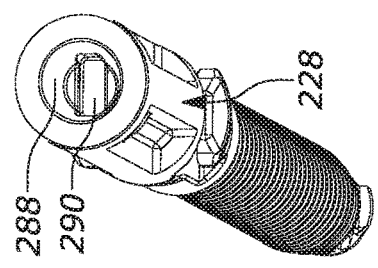
FIG. 28
FIG. 32
FIG. 31
FIG. 30
FIG. 29

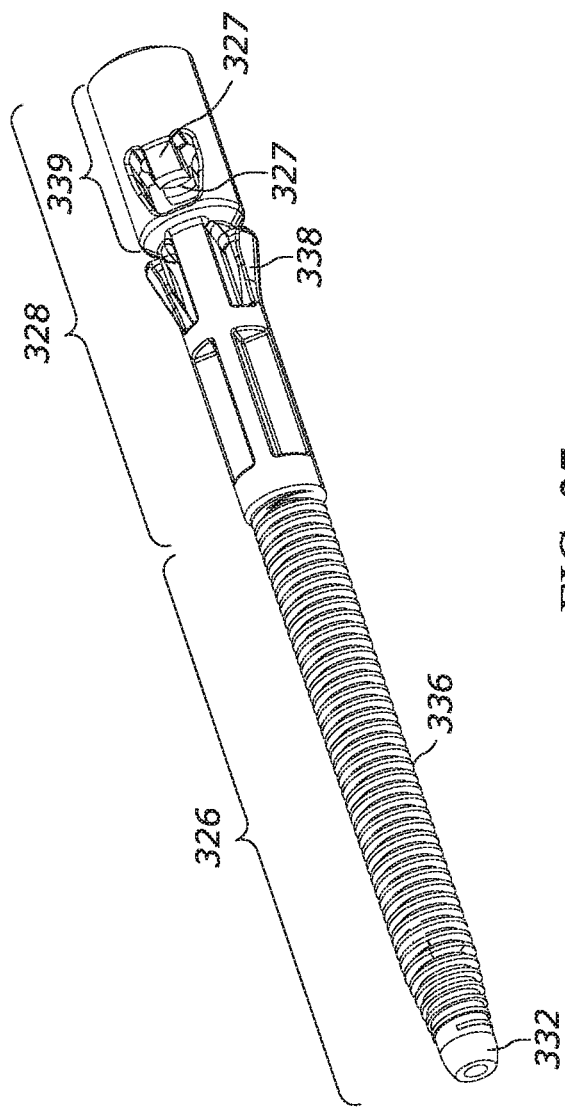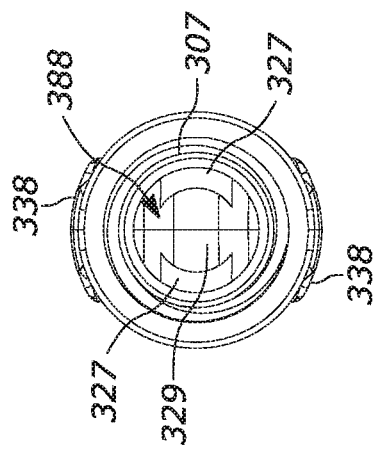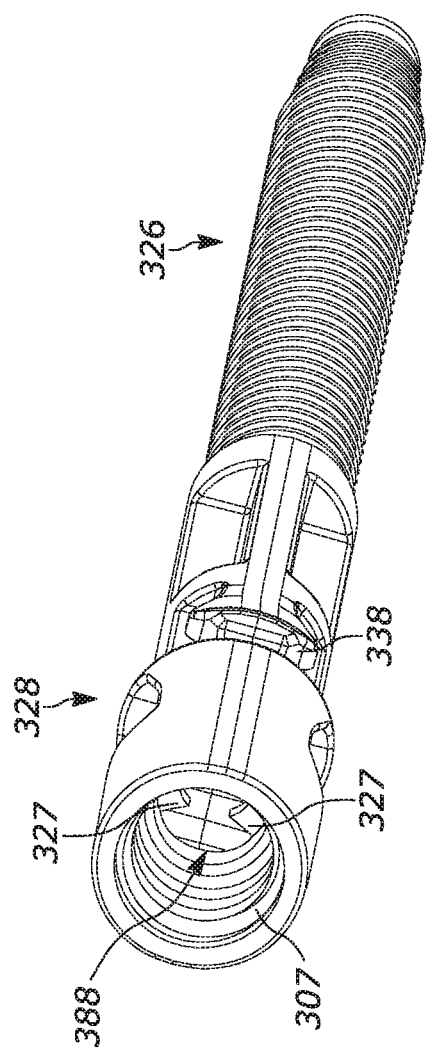
FIG. 37
FIG. 39
FIG. 38

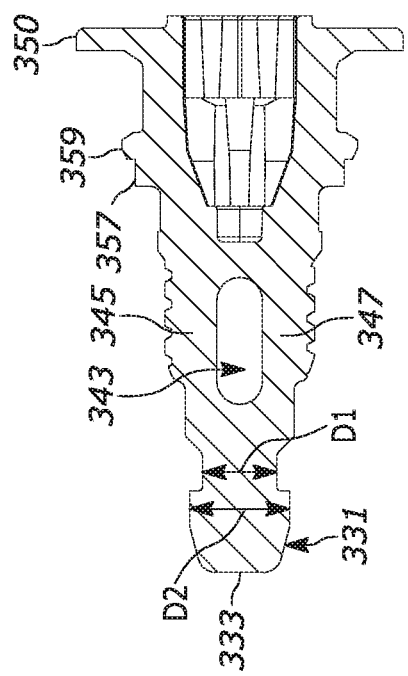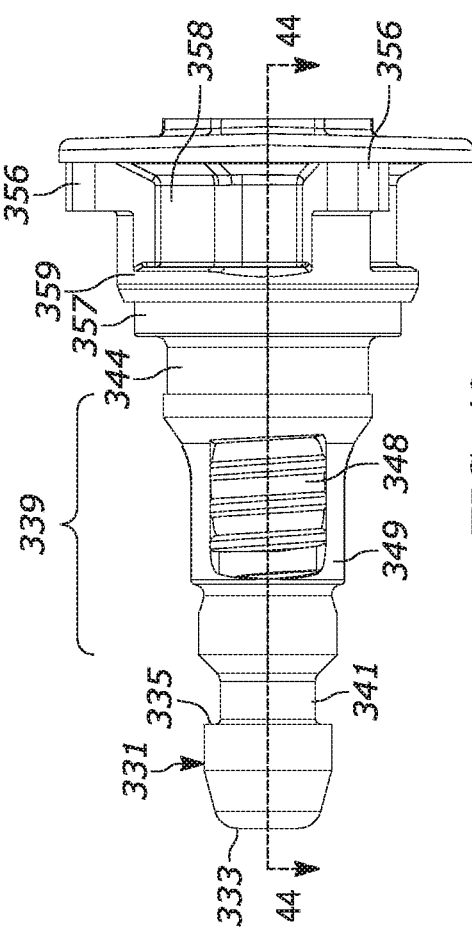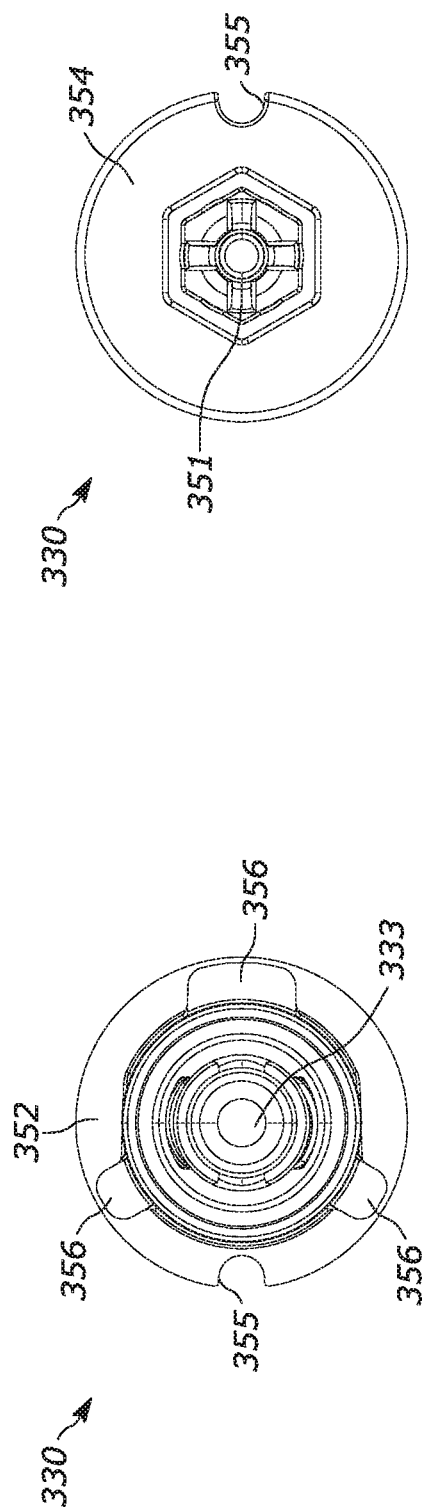
FIG. 44
FIG. 46
FIG. 43
FIG. 45

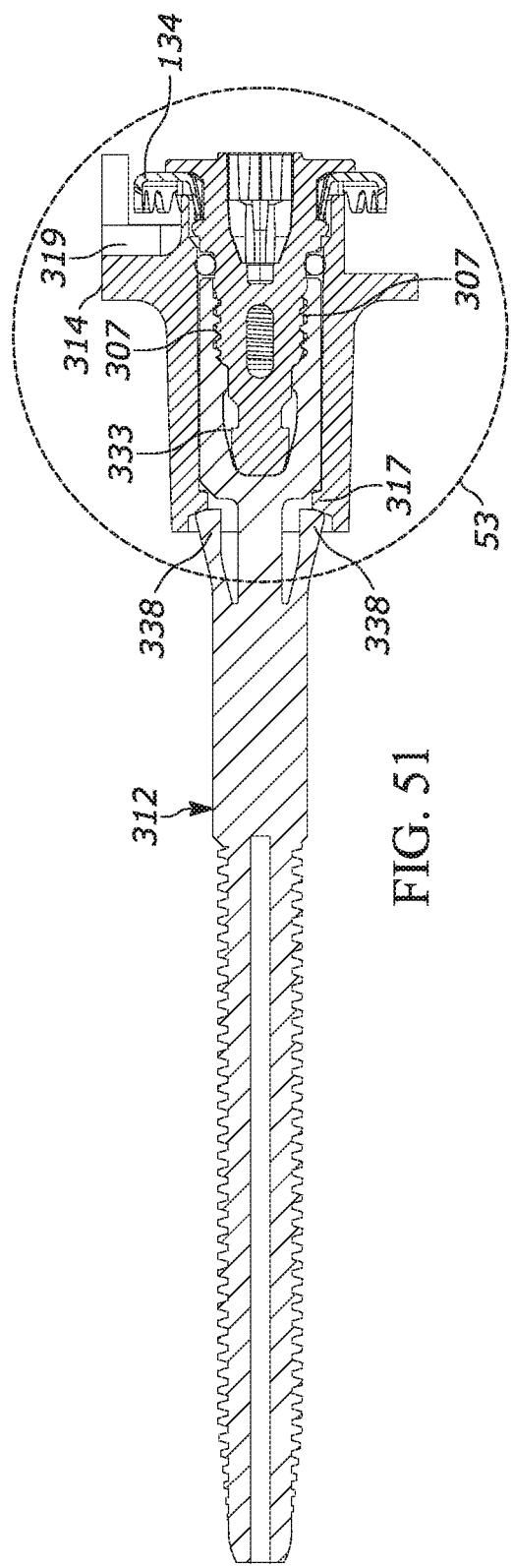
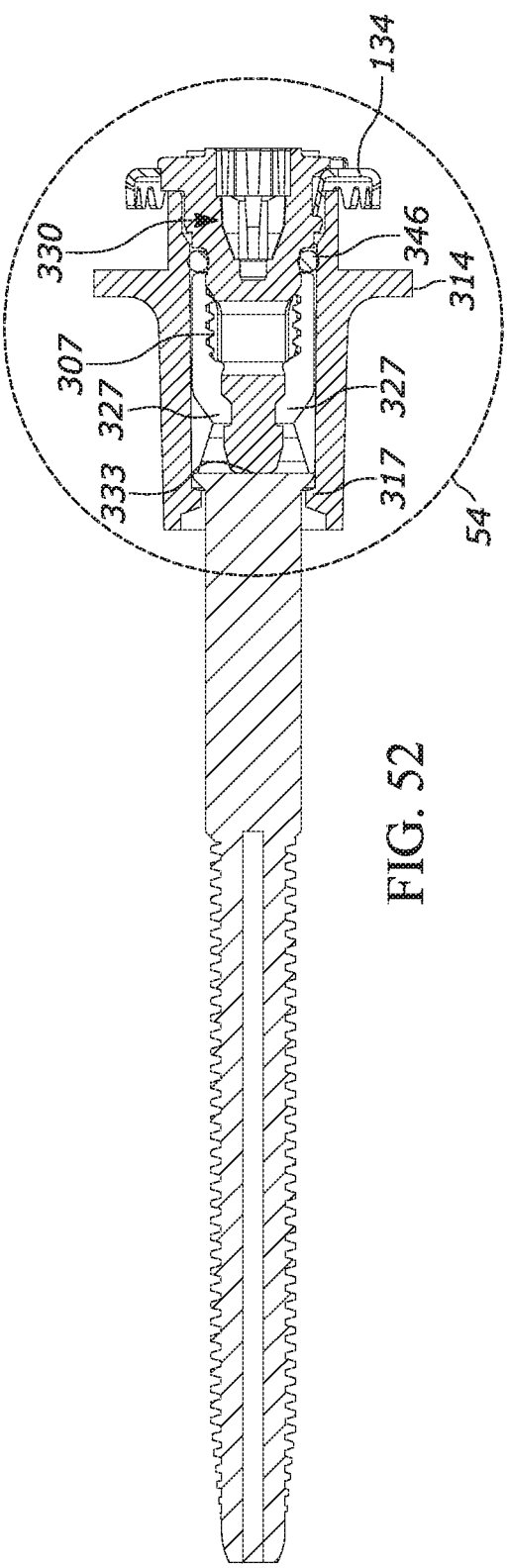
FIG. 51
FIG. 52

US 11,161,449 B2

ADJUSTER GEAR SCREW

CROSS-REFERENCE TO RELATED APPLICATION

This application claims priority to U.S. Provisional Patent Appl. No. 62/744,196 filed on Oct. 11, 2018, the disclosure of which is incorporated herein by reference in entirety for all purposes.

FIELD OF THE INVENTION

The present invention relates generally to the field of adjusting devices, and in particular to an adjuster gear screw used in connection with motor vehicle lamps.

BACKGROUND OF THE INVENTION

As the design of vehicles, automobile, and light trucks in particular, has evolved, headlamps and other vehicle lamps have continually been reconfigured to improve the aerodynamics of the front end of the vehicle. However, adjustment of these lamps must still be performed in order to provide the required aiming of the light beams. In an automotive lamp assembly, a lamp housing supports one or more reflectors having one or more lamps secured thereto. Typically, the reflector mounts inside the housing on a pivotable joint and is adjustable horizontally and/or vertically using one or more adjusters that interface with the reflector. A lens is provided to seal the front of the assembly to protect it from the elements.

SUMMARY OF THE INVENTION

In at least some embodiments, an adjuster gear screw is provided that includes an adjuster shaft having a threaded portion and a shaft end; a gear head having a plurality of radial protrusions spaced by a plurality of radial indents, and a flange having a flange front surface; an elongated neck interconnecting the adjuster shaft and the gear head; and a gear having a gear rear surface, a plurality of teeth positioned along an outer circumference, and a plurality of fingers and a plurality of notches extending along an inner circumference; wherein the gear is axially secured to the gear head in a first longitudinal direction via abutment of the gear rear surface with the flange front surface, and in a second longitudinal direction via engagement of the plurality of fingers with the plurality of indents, and wherein the gear is rotationally secured to the gear head via abutment of the plurality of radial protrusions with the plurality of notches.

In at least some other embodiments, a lamp assembly is provided that includes a lamp housing; a reflector positioned within the lamp housing on at least one pivotable connector; a lamp positioned on the reflector within the lamp housing; and an adjuster gear screw coupled to the lamp housing and operably engaged to the reflector such that rotation of the gear screw pivots the reflector; wherein the adjuster gear screw comprises: an adjuster shaft having a threaded portion and a shaft end; a gear head having a plurality of radial protrusions spaced by a plurality of radial indents, and a flange having a flange front surface; an elongated neck interconnecting the adjuster shaft and the gear head; and a gear having a gear rear surface, a plurality of teeth positioned along an outer circumference, and a plurality of fingers and a plurality of notches extending along an inner circumference; wherein the gear is axially secured to the gear head in a first longitudinal direction via an abutment of the gear rear surface with the flange front surface, and in a second longitudinal direction via engagement of the plurality of fingers with the plurality of indents, and wherein the gear is rotationally secured to the gear head via abutment of the plurality of radial protrusions with the plurality of notches.

BRIEF DESCRIPTION OF THE DRAWINGS

Embodiments of the adjuster gear screw are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings:

FIG. 11 is an exploded rear perspective view of the adjuster gear screw of FIG. 9;

FIG. 12 is an exploded front perspective view of the adjuster gear screw of FIG. 9;

FIG. 13 is a side view of the adjuster gear screw of FIG. 9 without the gear installed;

FIG. 17 is a front view of the adjuster gear screw of FIG. 15;

FIG. 18 is a rear view of the adjuster gear screw of FIG. 15;

FIG. 19 is a front perspective view of the gear of FIG. 9;

FIG. 20 is a rear perspective view of the gear of FIG. 9;

FIG. 21 is a side view of the gear of FIG. 9;

FIG. 25 is a side view of another exemplary embodiment of the adjuster gear screw of FIG. 1;

FIG. 26 is a top view of the adjuster gear screw of FIG. 25;

FIG. 27 is a cross-sectional side view of the adjuster gear screw taken along line 27-27 of FIG. 26;

FIG. 28 is an exploded side view of the adjuster gear screw of FIG. 25;

FIG. 29 is a rear perspective view of the adjuster gear screw of FIG. 25 with the gear head removed;

FIG. 30 is a rear view of the adjuster gear screw of FIG. 25 with the gear head removed;

FIG. 31 is a side view of the gear head of the adjuster gear screw of FIG. 25.

FIG. 32 is a front perspective view of the gear head of the adjuster gear screw of FIG. 25.

FIG. 37 is a front perspective view of the adjuster gear screw of FIG. 33 with the gear head and gear removed;

FIG. 38 is a rear perspective view of the adjuster gear screw of FIG. 33 with the gear head and gear removed;

FIG. 39 is a rear view of the adjuster gear screw of FIG. 33 with the gear head and gear removed;

FIG. 43 is a top view of the gear head of FIG. 33;

FIG. 44 is a cross-sectional side view of the gear head taken along line 44-44 of FIG. 43;

FIG. 45 is a front view of the gear head of FIG. 33;

FIG. 46 is a rear view of the gear head of FIG. 33;

FIG. 51 is a cross-sectional side view of the adjuster gear screw and housing sleeve of FIG. 50 taken along line 51-51;

FIG. 52 is a cross-sectional top view of the adjuster gear screw and housing sleeve of FIG. 50 taken along line 52-52;

DETAILED DESCRIPTION

Figure 2:
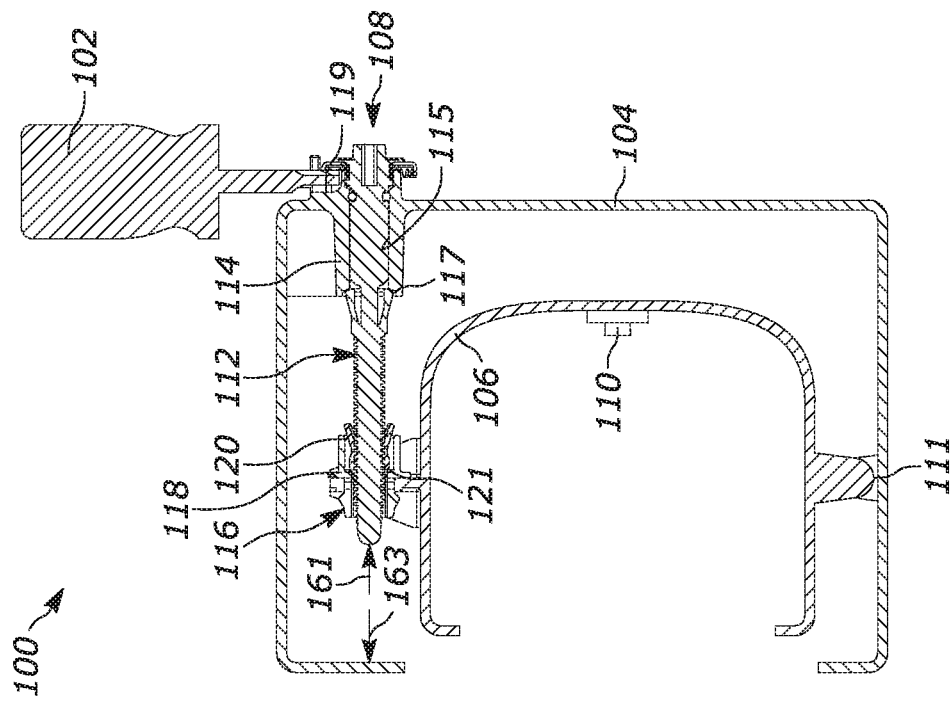
FIG. 2 is a cross-sectional side view of the lamp assembly and adjuster tool of FIG. 1 taken along line 2-2 of FIG. 1.
Figure 1:
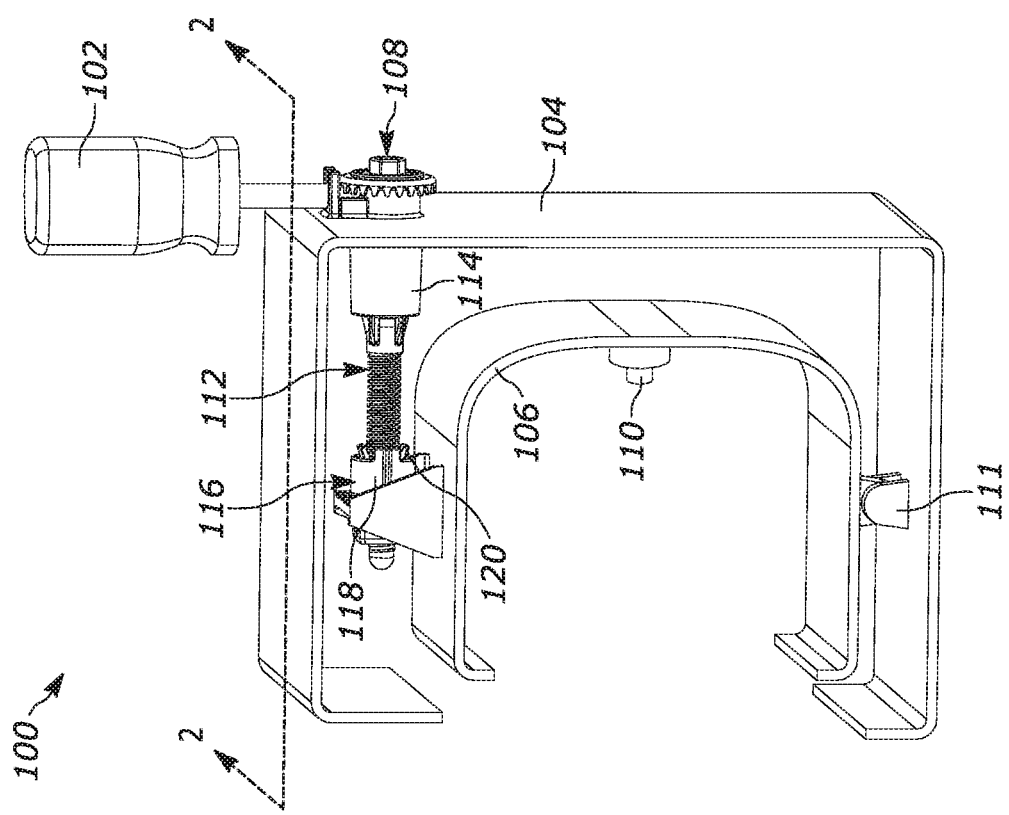
FIG. 1 is a perspective view of an exemplary embodiment of a lamp assembly and adjuster tool.

Referring to FIGS. 1 and 2, an exemplary embodiment of a lamp assembly 100 and an adjuster tool 102 is shown. The lamp assembly 100 includes a lamp housing 104, one or more reflectors 106, and an adjuster mechanism 108. One or more electrical lamps 110 are secured to the reflector using any of numerous known methods to provide a light source for emitting light from the assembly 100. The use of and securement of various types of lamps to a reflector in a vehicle lamp assembly are well known. Various shapes, sizes, and configurations of reflectors 106 and housings 104 are contemplated. The term "lamp assembly" shall be understood throughout to include various types of lamp assemblies, such as headlight assemblies, fog lamp assemblies, driving lamp assemblies, etc.

As shown, in at least some embodiments, the reflector 106 is coupled to the housing 104 by the adjuster mechanism 108 and one or more pivot points 111, such that actuation of the adjuster mechanism 108 using the adjuster tool 102 causes the reflector 106 to vary at least one of a horizontal and a vertical position relative to the housing 104, thereby changing the aim of the lamp 110. In at least some embodiments, the adjuster mechanism 108 includes an adjuster gear screw 112 that is laterally secured to a housing sleeve 114 and threadingly coupled to a socket assembly 116 secured to the reflector 106. The housing sleeve 114 can be integrally formed with the housing 104 or secured thereto, and includes a cylindrical passage 115, a circular retention ridge 117 and a tool slot 119.

Figure 3:
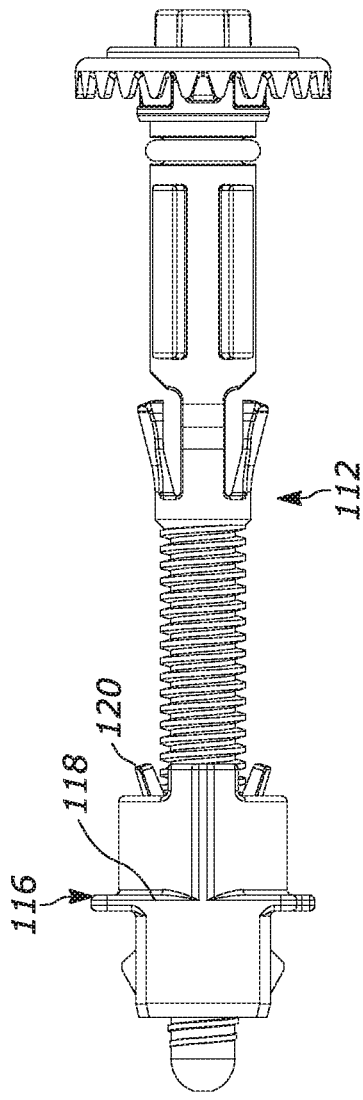
FIG. 3 is a side view of an exemplary adjuster gear screw and socket assembly of the lamp assembly of FIG. 1.
Figure 9:
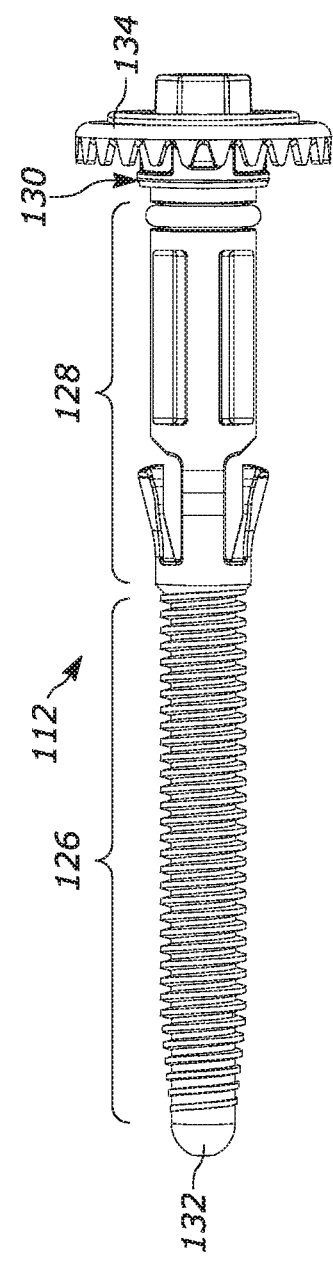
FIG. 9 is a side view of the adjuster gear screw of FIG. 1.
Figure 10:
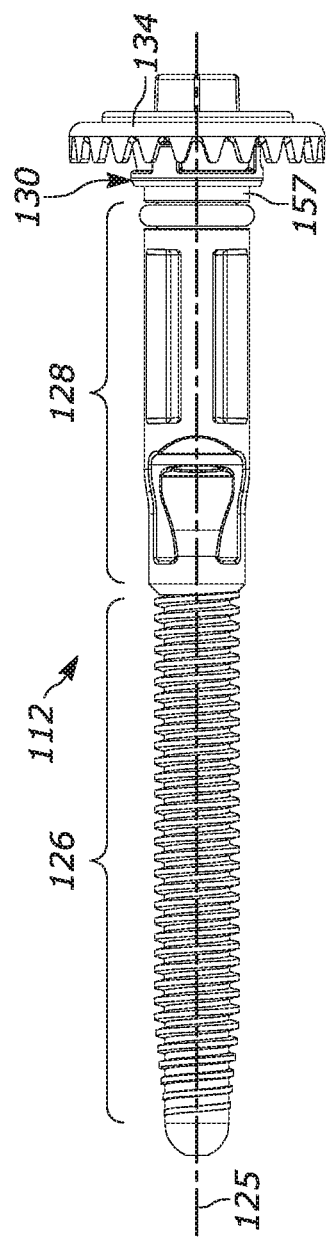
FIG. 10 is a top view of the adjuster gear screw of FIG. 1.
Figure 5:
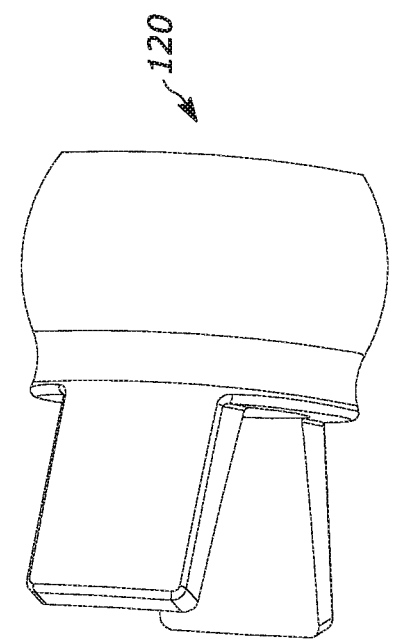
FIG. 5a is a side perspective view of the socket ball of FIG. 4.
Figure 4:
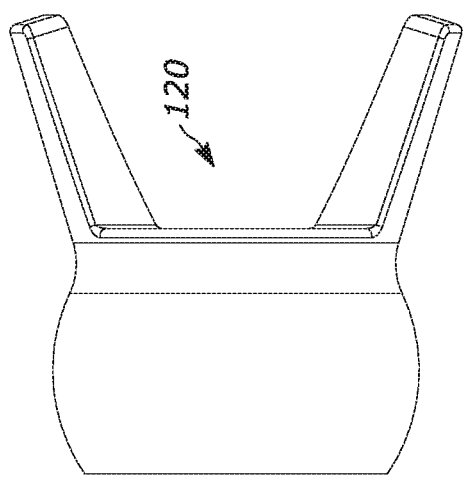
FIG. 4 is a side view of an exemplary socket ball of the socket assembly provided in FIG. 3.
Figure 8:
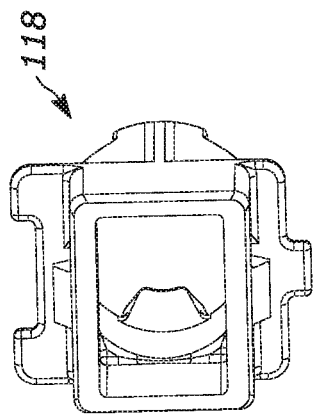
FIG. 8 is another front perspective view of the ball socket of the socket assembly provided in FIG. 3.
Figure 7:
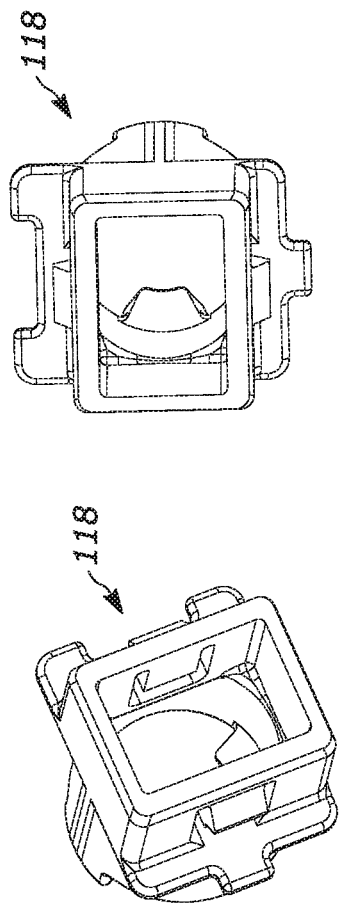
FIG. 7 is a front perspective view of the ball socket of the socket assembly provided in FIG. 3.
Figure 6:
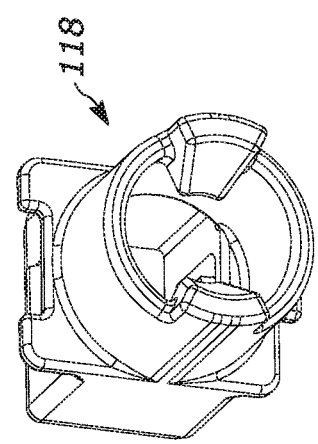
FIG. 6 is a rear perspective view of an exemplary ball socket of the socket assembly provided in FIG. 3.
Figure 14:
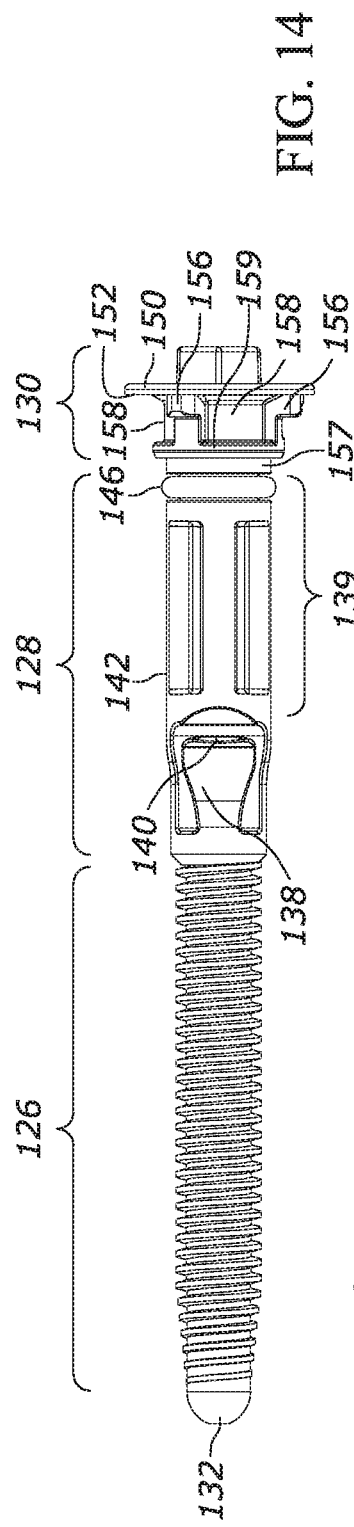
FIG. 14 is a top view of the adjuster gear screw of FIG. 9 without the gear installed.
Figure 15:
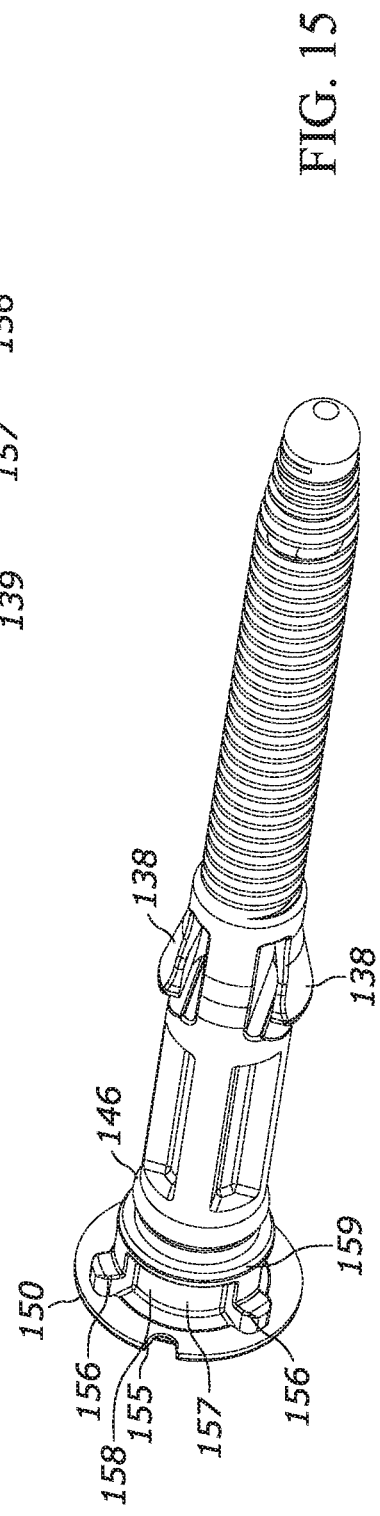
FIG. 15 is a perspective view of the adjuster gear screw of FIG. 9 without the gear installed.
Figure 16:
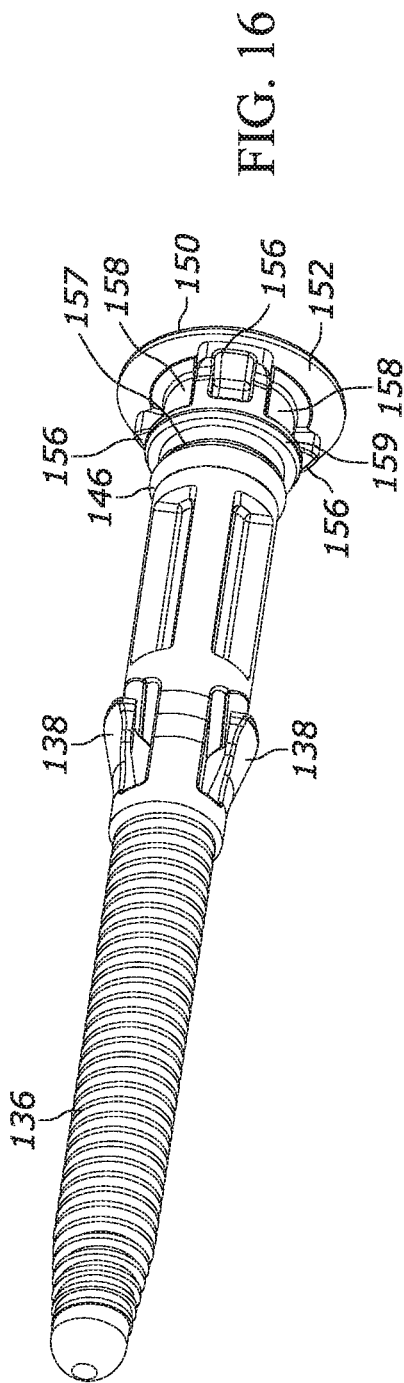
FIG. 16 is a perspective view of the adjuster gear screw of FIG. 9 without the gear installed.

FIG. 3 illustrates the adjuster gear screw 112 threadingly coupled to the socket assembly 116. In at least some embodiments, such as those shown in FIGS. 4-8, the socket assembly 116 can be comprised of a ball socket 118 and a threaded socket ball 120, wherein the socket ball 120 is secured at least partially inside the ball socket 118, and the ball socket 118 is secured to the reflector 106. In other embodiments, the socket assembly 116 can include more or less components, or merely be comprised of a threaded portion formed in or otherwise secured to the reflector 106, with or without any pivoting portion. The ball socket 118 and socket ball 120, as well as various other suitable socket assembly configurations for coupling a reflector to an adjuster are well known in the art. In at least some embodiments, the socket ball 120 includes socket threads 121 for engaging with the adjuster gear screw 112, and the socket ball 120 is secured to the ball socket 118 to allow pivoting, but not rotation.

The adjuster gear screw 112 can include numerous variations, although in at least some embodiments, such as shown in FIGS. 9-12, the adjuster gear screw 112 includes a longitudinal central axis 125 that extends through an adjuster shaft 126, an elongated neck 128, a gear head 130, a shaft end 132, and a gear 134. Referring to FIGS. 13-18, the adjuster gear screw 112 is shown without the gear 134 attached. As shown, in at least some embodiments, the adjuster shaft 126 can include a plurality of shaft threads 136 extending between the neck 128 and the shaft end 132. In at least some embodiments, the neck 128 is at least in part cylindrical and can include a plurality of neck retention tabs 138 situated between the adjuster shaft 126 and a shank portion 139 of the neck 128. Further, in at least some embodiments, the neck retention tabs 138 include tab end walls 140 (FIG. 13), and are biased outward from the neck 128 (away from the central axis 125) such that the tab end walls 140 are at least in part, positioned a greater distance from the central axis 125 than an outer surface 142 of the shank portion 139. The neck 128 can further include a groove 144 (FIG. 12) for securing an O-ring 146 at least partially therein.

As best seen in FIGS. 15-18, the gear head 130 includes a radially extending flange 150 having a flange front surface 152, a flange rear surface 154, and a flange notch 155, wherein in at least some embodiments, the flange front surface 152 is substantially planar, while in other embodiments it can be non-planar. In addition, the gear head 130 includes a plurality of radial protrusions 156 extending from an elongated cylindrical head base portion 157, forming at least in part, a plurality of spaced radial indents 158 positioned between the protrusions 156. The protrusions 156 and indents 158 can include various sizes, shapes, and quantities in addition to or in place of the illustrated embodiment. A retention wall 159 at least partially encircles the head base portion 157 and includes a circumference that is greater than the circumference of the head base portion 157. The head base portion 157 extends generally between the groove 144 and the flange 150 and can include structure that is exposed as well as structure extending therefrom. More particularly, the head base portion 157 provides a central core for the gear head 130.

Figure 22:
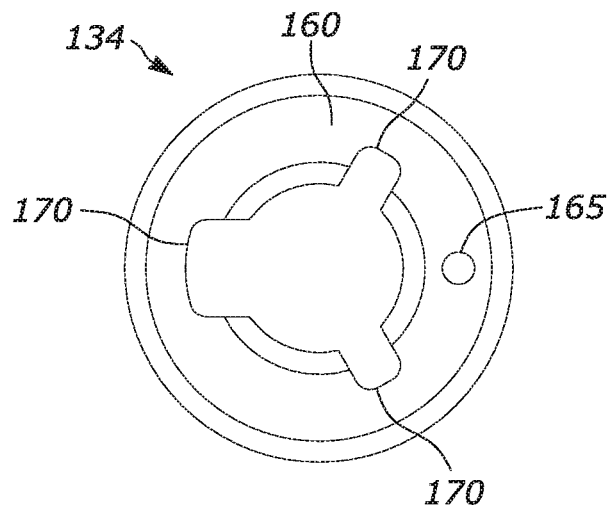
FIG. 22 is a rear view of the gear of FIG. 9.

Referring to FIGS. 19-24, various views of the gear 134 are provided. As shown, in at least some embodiments, the gear 134 includes a gear rear surface 160, a gear front surface 162, a gear alignment aperture 165, a plurality of teeth 164 positioned along an outer circumference 166 (FIG. 22), a plurality of fingers 168, and plurality of notches 170 extending along an inner circumference 171 (FIG. 22). The teeth 164 are configured for engagement with the adjuster tool 102 and can include any one of various sizes and shapes to matingly engage with the adjuster tool 102.

The notches 170 are generally sized and shaped to matingly receive the protrusions 156 therein and therefore can include various shapes, sizes, and quantities. In some embodiments, the protrusions 156 (and likewise the notches 170) can be identical in form, while in other embodiments, such as shown, one or more can vary in form from the others (e.g., one larger than the others), which can assist with forcing a chosen rotational placement of the gear 134 on the gear head 130.

Figure 23:
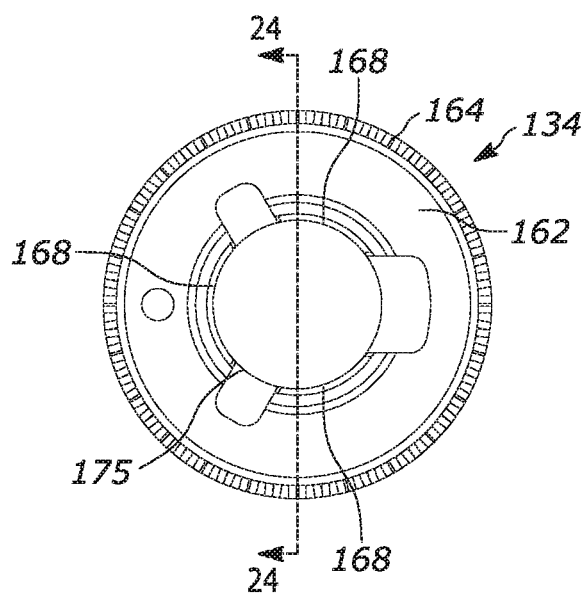
FIG. 23 is a front view of the gear of FIG. 9.
Figure 24:
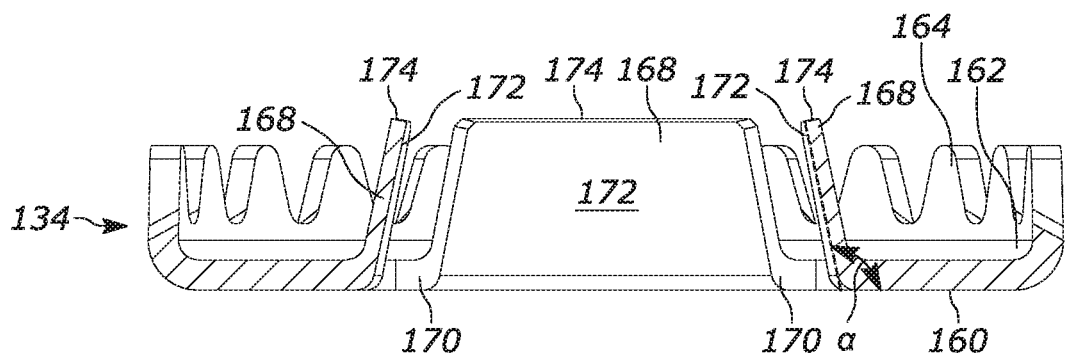
FIG. 24 is a cross-sectional side view of the gear of FIG. 9 taken along line 24-24 of FIG. 23.
Figure 33:
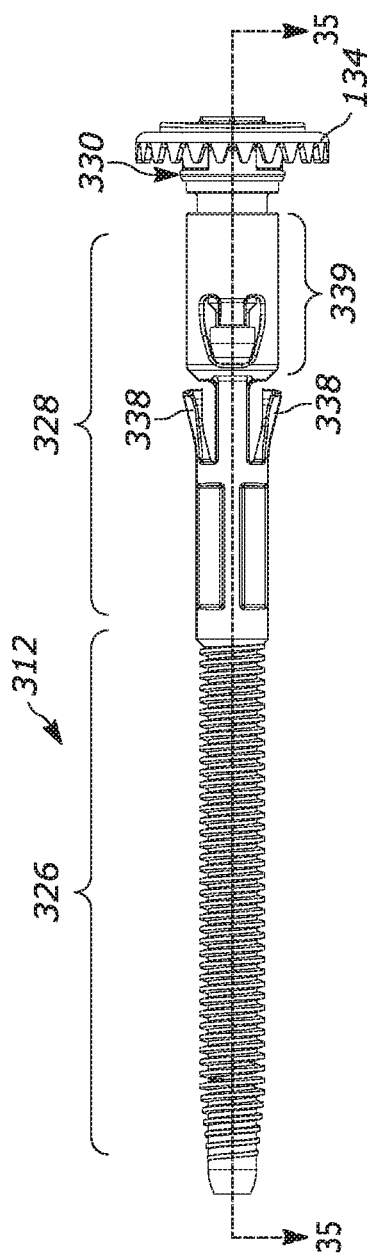
FIG. 33 is a side view of another exemplary embodiment of the adjuster gear screw.
Figure 34:
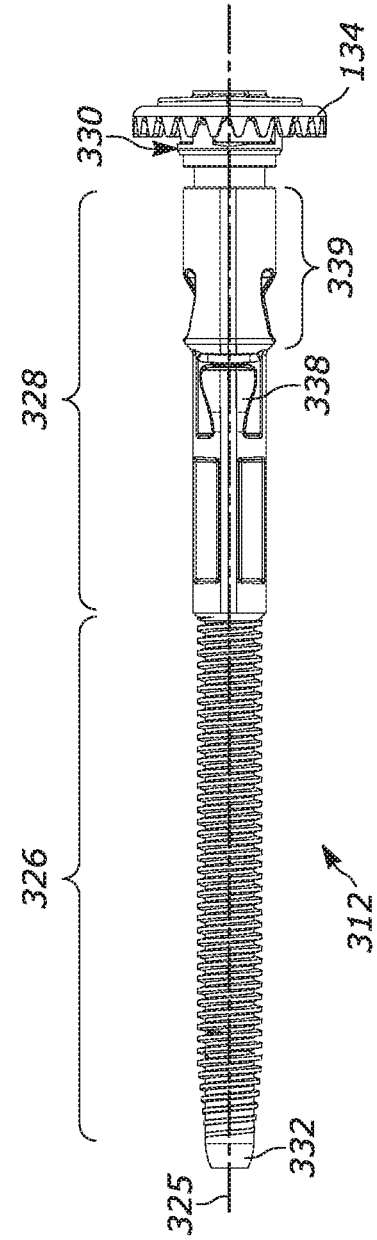
FIG. 34 is a top view of the adjuster gear screw of FIG. 33.
Figure 35:
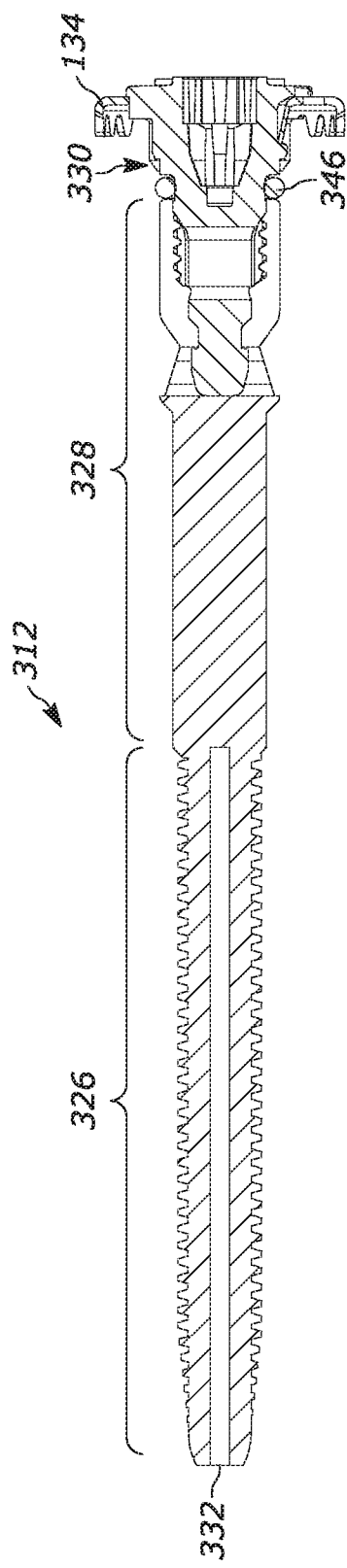
FIG. 35 is a cross-sectional top view of the adjuster gear screw of FIG. 33 taken along line 35-35 of FIG. 33.
Figure 36:
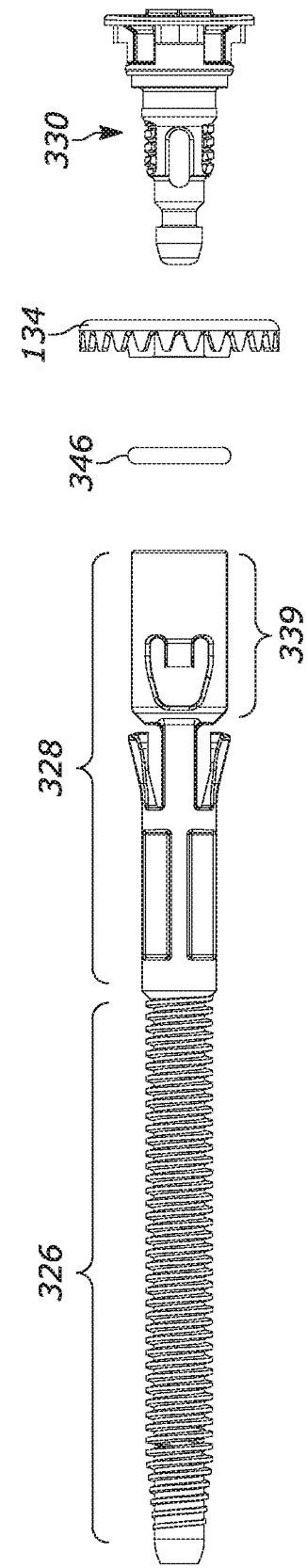
FIG. 36 is an exploded side view of the adjuster gear screw of FIG. 33.
Figure 40:
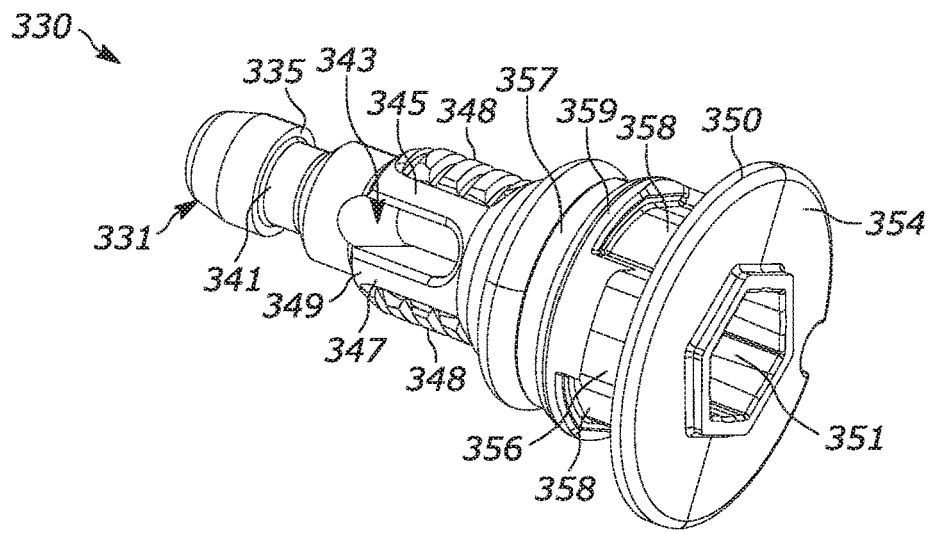
FIG. 40 is a rear perspective view of the gear head of FIG. 33.
Figure 41:
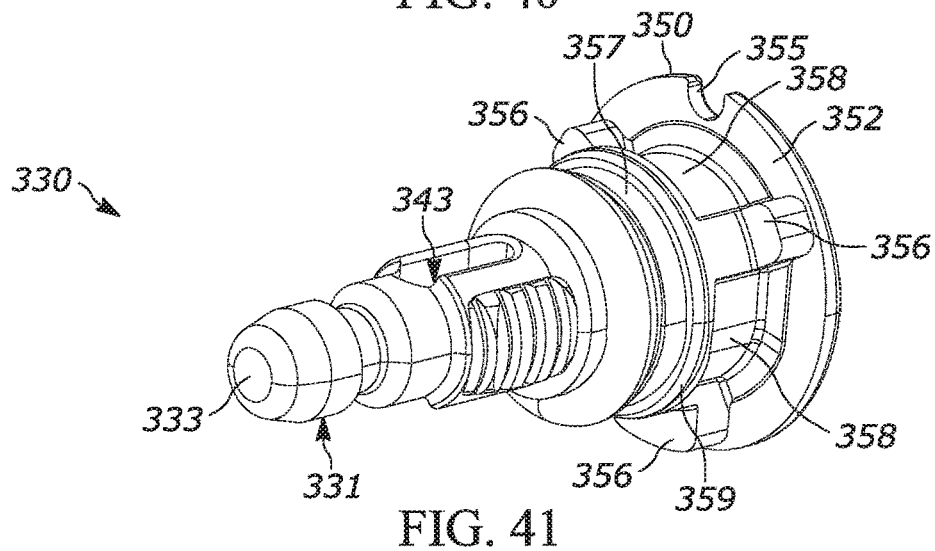
FIG. 41 is a front perspective view of the gear head of FIG. 33.

As best seen in the cross-sectional view of the gear 134 in FIG. 24, the fingers 168 include a finger inner wall 172 and a wall end portion 174, with the wall end portions 174 forming an end portion circumference 175 (FIG. 23). The fingers 168 extend away from the gear rear surface 160, having an angle α as shown that extends between the finger inner wall 172 and the gear rear surface 160. As shown, the angle α can be equal to about 100 degrees, while in at least some other embodiments, the angle α can range between about 90 degrees and about 110 degrees, and in at least some yet further embodiments, the angle α can be greater than 110 degrees. Utilizing an angle α that is greater than 90 degrees (inward taper) allows for an inward biasing of the fingers 168 to enhance a secure fitment to the gear head 130. In at least some embodiments, angle α is greater than 90 degrees, and therefore cannot be 90 degrees.

Assembling the adjuster gear screw 112 can include inserting the gear 134 over the shaft end 132 of the adjuster shaft 126 and sliding it to the gear head 130 while aligning the gear alignment aperture 165 with the flange notch 155, wherein the protrusions 156 are aligned with the notches 170 to allow the gear 134 to be snapped in place with the gear rear surface 160 in abutment, or close to abutment with the flange front surface 152 (i.e., snap fit engagement). The gear 134 is axially secured to the gear head 130 in a first longitudinal direction 161 (FIG. 2) via abutment of the gear rear surface 160 with the flange front surface 152 and in a second longitudinal direction 163 via engagement of the plurality of fingers 168 with the plurality of indents 158. More particularly, as the gear 134 is passed over the retention wall 159, the inwardly biased fingers 168 are forced outward to overcome the increased circumference, once passed the retention wall 159, the fingers 168 snap inward to rest in the indents 158. As the end portion circumference 175 formed by the fingers 168 is less than the circumference of the retention wall 159, and the fingers 168 are generally biased inward, the retention wall 159, which forms part of the indent 158, prevents the gear 134 from sliding back off the gear head 130. In addition to providing axial securement, the gear 134 is rotationally secured to the gear head 130 to prevent rotational movement therebetween. More particularly, once the plurality of fingers 168 snap into the plurality of indents 158, and the protrusions 156 are positioned within the notches 170, any rotational force applied to the gear 134 is transferred to the gear head 130 via abutment of the notches 170 with the protrusions 156, and the fingers 168 with the indents 158. This configuration provides significant coupling strength as the numerous abutting surfaces can withstand a high amount of rotational force, as compared to prior art designs that include placing a gear in a mold and then injection molding the gear directly to a gear head. In addition, by installing the gear 134 on a gear head 130 after formation is complete, the mold for the gear head 130 can be more efficiently designed and the problem of excessive flashing during the manufacturing process can be eliminated.

Once the adjuster gear screw 112 is assembled as described above, it can be incorporated as part of the adjuster mechanism 108. Referring again to FIGS. 1 and 2, it can be seen that in at least one embodiment, the adjuster gear screw 112 is inserted through the cylindrical passage 115 of the housing sleeve 114, which is slightly larger in diameter than the shank portion 139 to allow rotational movement within the cylindrical passage 115. The adjuster gear screw 112 is axially secured to the housing sleeve 114 via engagement of the retention wall 159 and the neck retention tabs 138, wherein the neck retention tabs 138 are compressed inward during insertion into the housing sleeve 114 and then spring open to create an abutment or potential abutment of their tab end walls 140 with the retention ridge 117 of the housing sleeve 114. The adjuster shaft 126 is threadably secured to the reflector 106, such as by a threaded engagement with the socket assembly 116. Engaging the adjuster tool 102 with the gear 134 on the outside of the housing 104 and rotating, causes the adjuster gear screw 112 to rotate and the socket assembly 116 to translate along the adjuster shaft 126 such that the reflector 106 pivots. Pivoting of the reflector 106 is outward in a first direction when the tool 102 is rotated one direction and inward in a second opposite direction when the tool 102 is rotated in an opposite direction.

Various modifications can be incorporated into the adjuster gear screw 112. For example, in at least some embodiments, the shaft end 132 of the adjuster shaft 126 can include a plurality of outwardly biased retention arms to prevent the socket assembly 116 from being over-rotated off the adjuster shaft 126. Also, in addition to the gear 134 being a separately formed component, one or more other portions of the adjuster gear screw 112 can be formed non-integrally as well. For example, the gear head 130 can be formed separately from the neck 128 and then secured thereto. One such embodiment is disclosed in FIGS. 25-32 with reference to adjuster gear screw 212. Adjuster gear screw 212 is similar to adjuster gear screw 112 in that it can include a threaded adjuster shaft 226, a neck 228, a gear head 230, one or more neck retention tabs 238, and a shaft end 232. The adjuster gear screw 212 utilizes the same securable gear 134, as adjuster gear screw 112.

Although the gear head 230 is not integrally formed with the neck 228, it shares many features with the gear head 130 in that it is configured to receive and secure the gear 134 in the same manner. More particularly, with reference to FIGS. 31 and 32, in at least some embodiments, the gear head 230 includes a flange 250 similar to flange 150, having a flange front surface 252, a flange rear surface 254, and a flange notch 255. The gear head 230 also includes a plurality of radial protrusions 256 extending from a cylindrical head base portion 257, forming at least in part, a plurality of spaced radial indents 258 positioned between the protrusions 256. The protrusions 256 and indents 258 can include various sizes, shapes, and quantities in addition to or in place of the illustrated embodiment. A retention wall 259 at least partially encircles the head base portion 257 and includes a circumference that is greater than the circumference of the head base portion 257.

As best seen in the exemplary cross-sectional side view and exploded view of the adjuster gear screw 212 in FIGS. 27 and 28, the gear head 230 is a separate component configured to be engaged to the neck 228. More particularly, referring to FIGS. 27-32, in at least some embodiments, the gear head 230 includes a conical nose 282 having a plurality of prongs 284 on a nose end 286. A shank portion 239 of the neck 228 includes a cavity 288 sized and shaped to matingly receive the nose 282 therein and an outer surface 242. In at least some embodiments, the prongs 284 include one or more squared corners 289, which engage an at least partially mating end wall portion 290 at the back of the cavity 288, so as to prevent rotation of the gear head 230 relative to the neck 228 when the gear 134 is rotated during adjustment. Various other shapes and sizes of mating portions can be utilized to couple the gear head 230 to the neck 228. In at least some other embodiments, the nose 282 can be secured in the cavity 288 using any one of numerous known methods for coupling plastic or other types of components, such as welding, epoxy, mechanical joint, etc.

The adjuster gear screw 212 can also include a groove 244 in the neck 228 for securing the O-ring 146 at least partially therein, and in at least some embodiments, can include one or more retention arms 280 (FIG. 25) extending from the shaft end 232. The adjuster gear screw 212 operates the same as adjuster screw 112 in that it is inserted into the housing sleeve 114 and engages with the socket assembly 116 in order to provide adjustability for the reflector 106 in the lamp housing 104. The retention arms 280 serve to prevent the adjuster shaft 226 from being completely rotated out of the socket assembly 116, as the retention arms 280 will abut the socket assembly 116 if the adjuster shaft 226 is excessively retracted. The adjuster mechanism 108, which forms part of the lamp assembly 100, can include either adjuster gear screw 112 or adjuster gear screw 212.

Another embodiment is disclosed in FIGS. 33-54 with reference to an adjuster gear screw 312, wherein the adjuster gear screw 312 is also provided with a gear head formed separately from a neck and then secured thereto. Adjuster gear screw 312 is similar to adjuster gear screws 112 and 212 in that it can include a threaded adjuster shaft 326 having threads 336, a neck 328, a gear head 330, one or more neck retention tabs 338, and a shaft end 332. The adjuster gear screw 312 utilizes the same securable gear 134, as adjuster gear screws 112 and 212.

Referring to FIGS. 37-39, various views of the adjuster gear screw 312 with the gear head 330 and gear 134 removed are provided. As shown, the neck 328 includes a cavity 388, situated in a shank portion 339, and having internal threads 307 along a portion thereof and one or more head retention tabs 327. In at least some embodiments, at least two head retention tabs 327 are provided and positioned opposite each other.

FIGS. 40-46 provide various views of the gear head 330. Although gear head 330 is not integrally formed with the neck 328, it shares many features with the gear head 130 in that it is configured to receive and secure the gear 134 in the same manner. More particularly, the gear head 330 includes a flange 350 similar to flange 150, having a flange front surface 352, a flange rear surface 354, and a flange notch 355. The gear head 330 also includes a plurality of radial protrusions 356 extending from a cylindrical head base portion 357, forming at least in part, a plurality of spaced radial indents 358 positioned between the protrusions 356. The protrusions 356 and indents 358 can include various sizes, shapes, and quantities in addition to or in place of the illustrated embodiment. A retention wall 359 at least partially encircles the head base portion 357 and includes a circumference that is greater than the circumference of the head base portion 357. The gear head 330 can also include a groove 344 for receiving the O-ring 346 at least partially therein, and an engagement interface 351 (e.g., hex interface, Philips-head interface, etc.) (FIG. 46) for engaging the adjuster tool 102.

The gear head 330 further includes a nose 382 that provides features for interlocking with the neck 328, as well as clutching therewith. More particularly, the nose 382 includes an end plug 331 and a clutch portion 337. In at least some embodiments, the end plug 331 includes a plug end surface 333 and a plug abutment wall 335. In at least some embodiments the plug end surface 333 and the plug abutment wall 335 are generally planar, although some other embodiments can include other shapes. The end plug 331 is secured to or otherwise formed integrally with the clutch portion 337 via a collar 341, which in at least some embodiments is cylindrical, having a diameter D1 (FIG. 44) that is less than a diameter D2 of the plug abutment wall 335.

Figure 42:
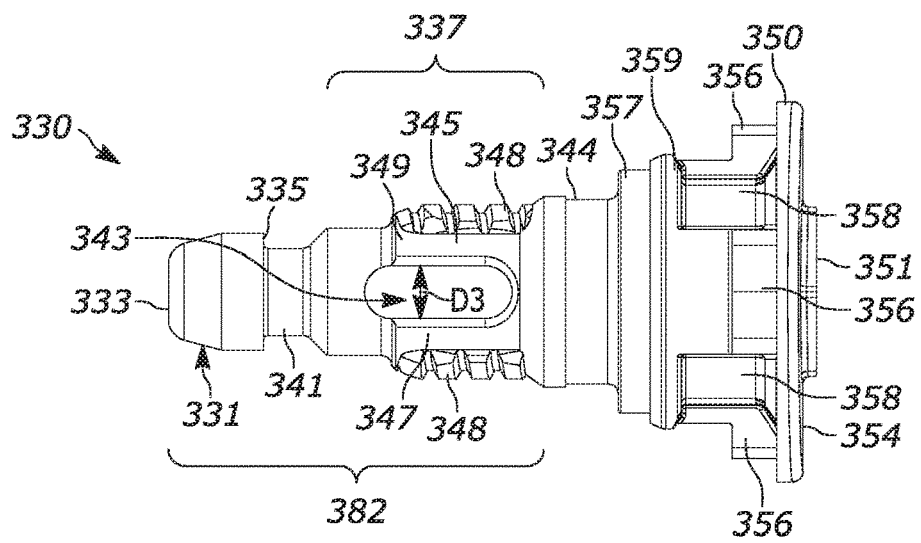
FIG. 42 is a side view of the gear head of FIG. 33.

In at least some embodiments, the clutch portion 337 extends between the collar 341 and the groove 344 (if present, otherwise the head base portion 357). The clutch portion 337 includes a clutch slot 343 (i.e., aperture) situated between a first clutch member 345 and a second clutch member 347, wherein in at least some embodiments, the first clutch member 345 extends parallel with and opposite to the second clutch member 347. A distance D3 extends within the clutch slot 343 between the first clutch member 345 and the second clutch member 347 (FIG. 42). The first clutch member 345 and the second clutch member 347 each include a series of discontinuous external threads 348 that extend radially outward from an exterior surface 349 of the clutch portion 337.

Figure 48:
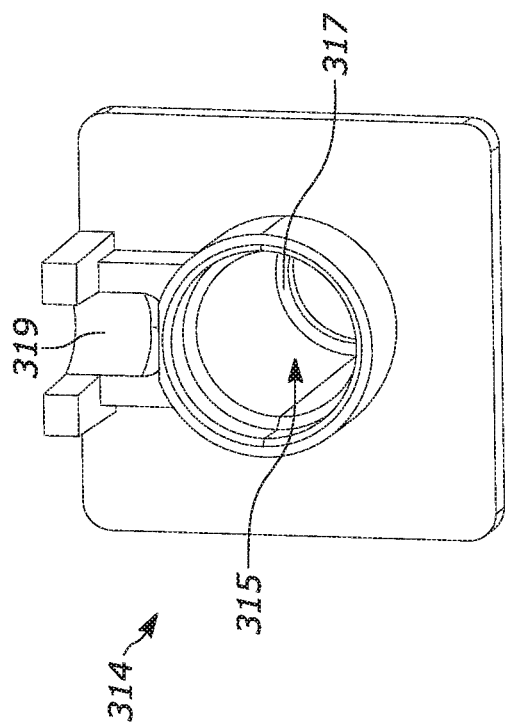
FIG. 48 is a rear perspective view of the housing sleeve of FIG. 47.
Figure 47:
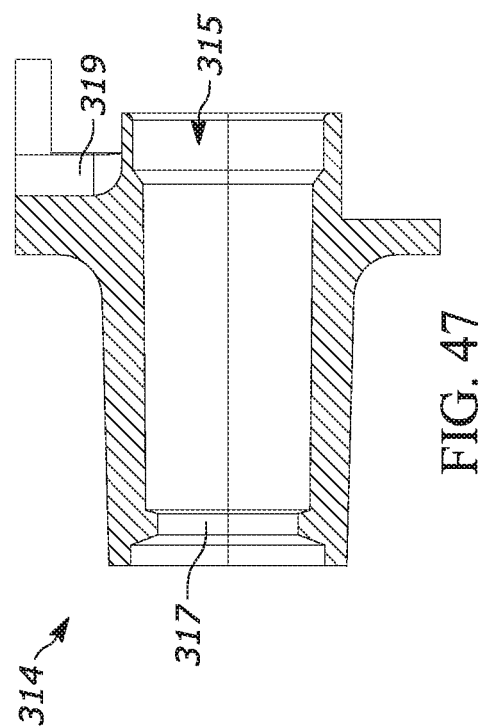
FIG. 47 is a cross-sectional view of another exemplary embodiment of a housing sleeve.
Figure 50:
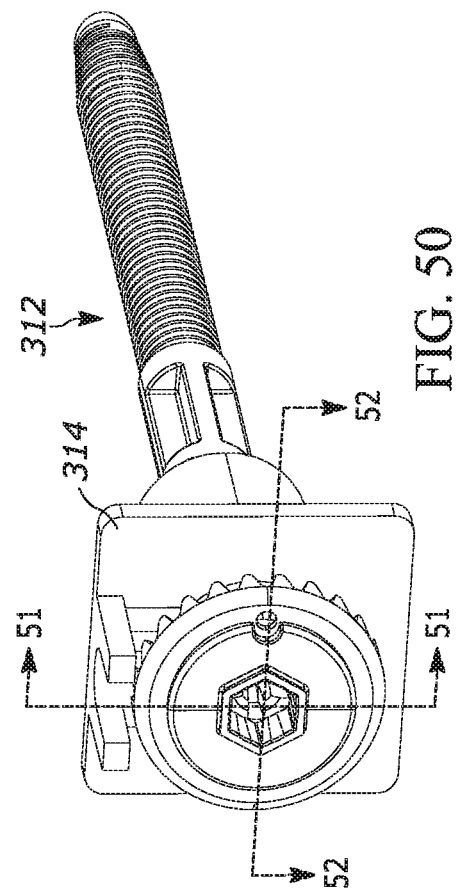
FIG. 50 is a perspective view of the adjuster gear screw of FIG. 33 positioned in the housing sleeve.

Referring now to FIGS. 47 and 48, a cross-sectional view and perspective view of another embodiment of housing sleeve 114 is provided, namely a housing sleeve 314. The housing sleeve 314 can be integrally formed with a lamp housing 304 (FIG. 49) or secured thereto, and includes a cylindrical passage 315, circular retention ridge 317, and tool slot 319. The lamp housing 304 can be similar in form or function to lamp housing 104.

Figure 49:
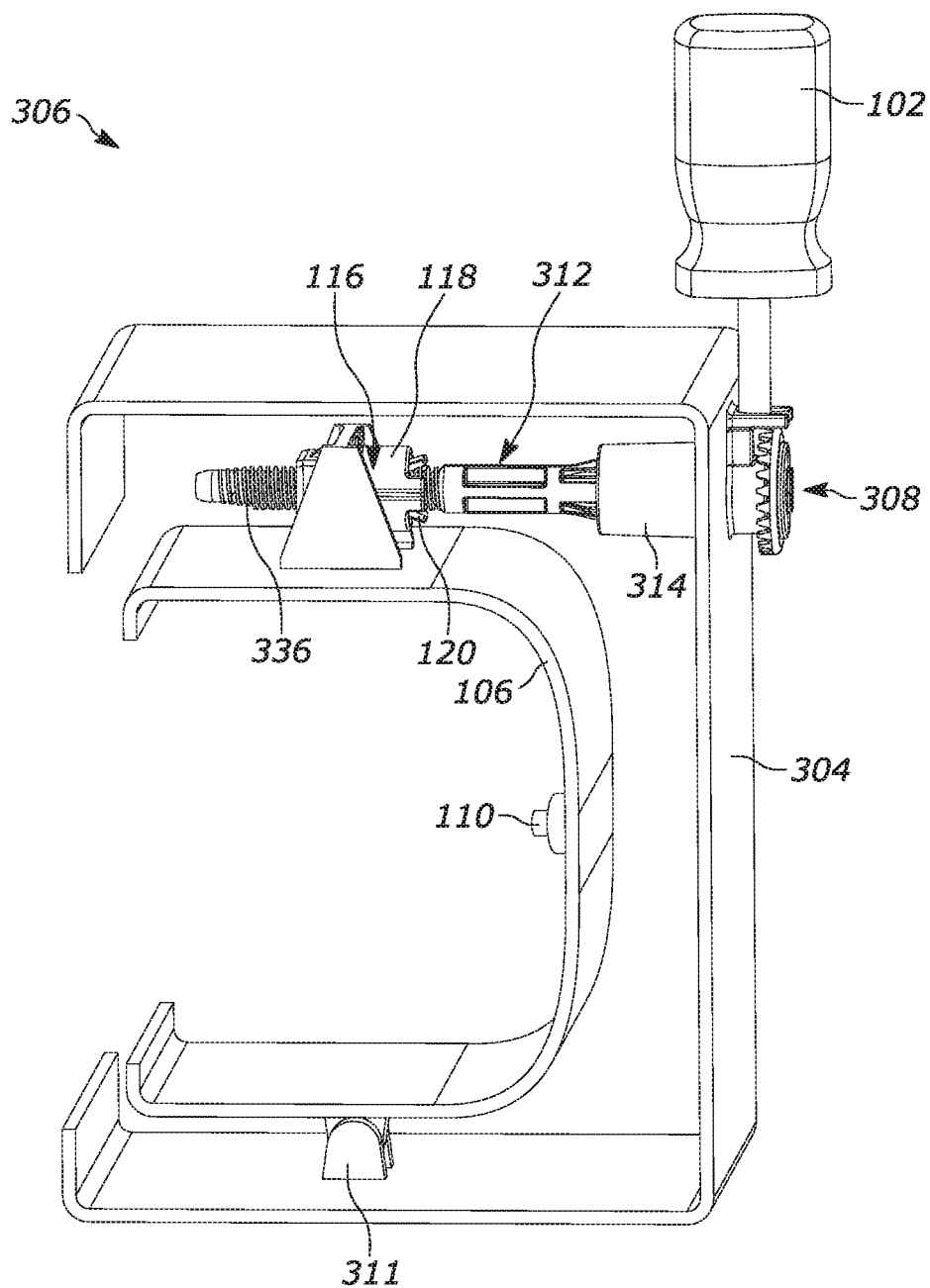
FIG. 49 is a perspective view of another exemplary embodiment of a lamp assembly including the adjuster gear screw of FIG. 33 and housing sleeve of FIG. 47.
Figure 54:
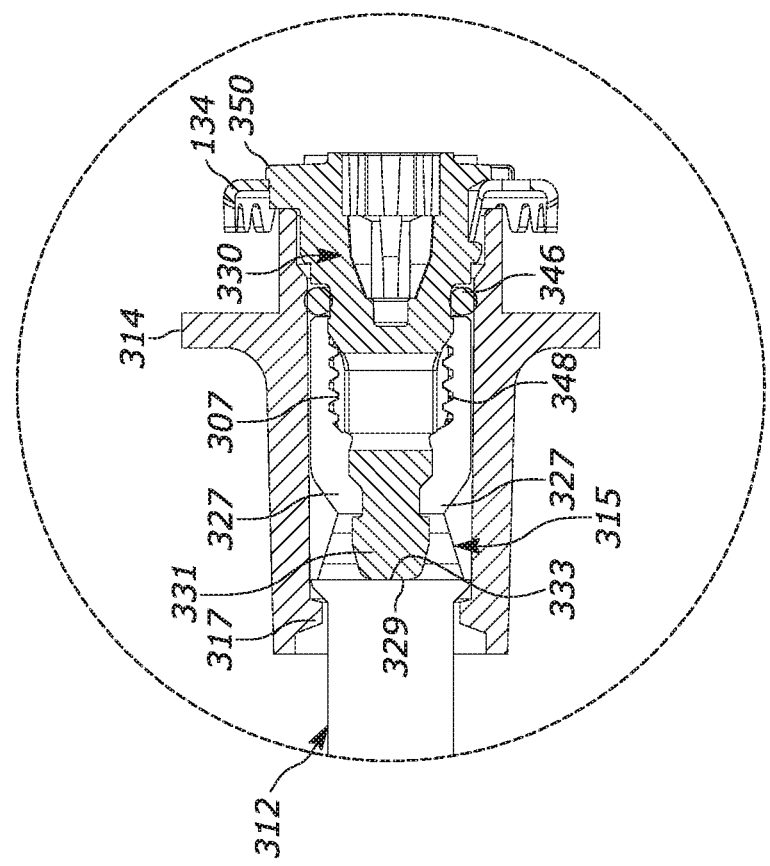
FIG. 54 is a partial view of the adjuster gear screw and housing sleeve of FIG. 52 taken at line 54.
Figure 53:
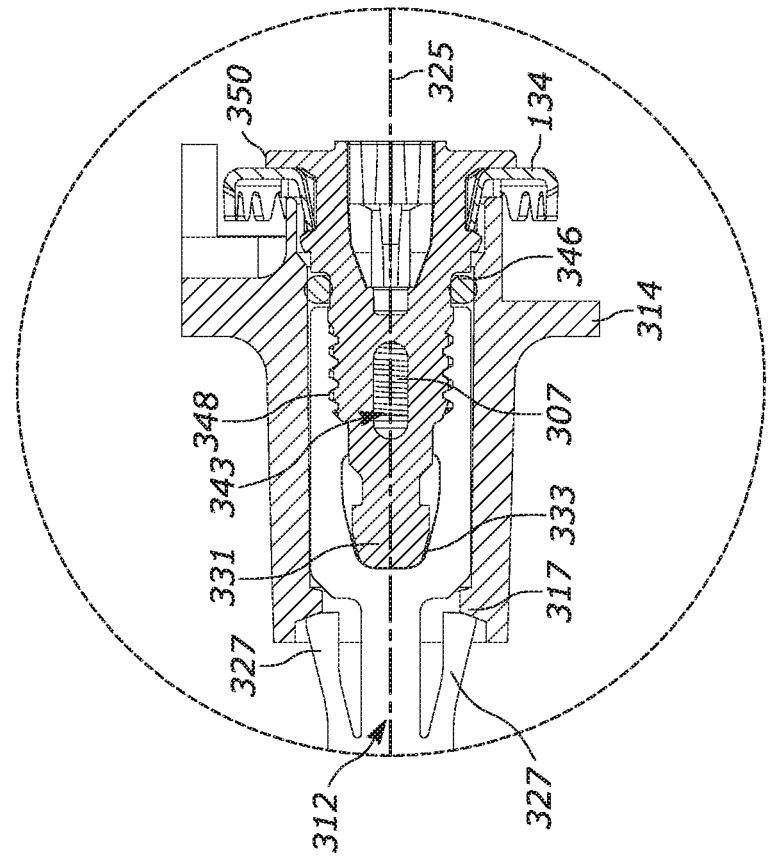
FIG. 53 is a partial view of the adjuster gear screw and housing sleeve of FIG. 51 taken at line 53.

Referring to FIG. 49, the adjuster gear screw 312 can utilized as part of an adjuster mechanism 308, which forms part of lamp assembly 300. Similar to the use of the adjuster gear screws 112 and 212 in the lamp assembly 100, the adjuster gear screw 312 can facilitate translation of the reflector 106 to provide aiming of a lamp 110. Although the adjuster gear screw 312 provides similar translation of a reflector 106, it further provides protectionary clutching action to protect components in the event the adjuster gear screw 312 is over-torqued. As shown, the lamp housing 304 can includes a pivot point 311 similar to pivot point 111.

Referring to FIGS. 50-54, various views of the assembled adjuster gear screw 312 positioned in the housing sleeve 314 are provided, noting the housing sleeve 314 is shown as a discrete component for illustration purposes, although in various embodiments the housing sleeve 314 is integrally formed with the housing 304 or other component(s).

Assembling the adjuster gear screw 312 begins prior to insertion into the housing sleeve 314. Securement of the gear 134 onto the gear head 330 is similar to securement of the gear 134 onto gear head 130 (as well as gear head 230), and can occur before or after securement of the gear head 330 with the neck 328. The gear 134 is slid over the shaft end 332 of the adjuster shaft 326 (if assembled) or over the nose 382 of the gear head 330 while aligning the gear alignment aperture 165 with the flange notch 355. The protrusions 356 are aligned with the notches 170 to allow the gear 134 to be snapped in place with the gear rear surface 160 in abutment, or close to abutment with the flange front surface 352 (i.e., snap fit engagement). The gear 134 is axially secured to the gear head 330 via engagement of the plurality of fingers 168 with the plurality of indents 358, and via abutment of the gear rear surface 160 with the flange front surface 352.

Securement of the gear head 330 to the neck 328 includes screwing the gear head 330 into the cavity 388 of the neck 328, such that the external threads 348 of the gear head 330 are engaged with the internal threads 307 in the cavity 388. As the end plug 331 translates axially through the cavity 388 via threading, it abuts the head retention tabs 327, spreading them apart until the plug abutment wall 335 passes by the head retention tabs 327, allowing them to snap back inwards to secure the end plug 331 axially between the head retention tabs 327 and cavity end wall 329, yet allow for rotation of the gear head 330 relative to the neck 328 during clutching.

Once assembled, the adjuster gear screw 312 is inserted through the cylindrical passage 315 of the housing sleeve 314, which is slightly larger in diameter than the shank portion 339, to allow rotational movement of the adjuster gear screw 312. The adjuster gear screw 312 is axially secured to the housing sleeve 314 via engagement of the neck retention tabs 338, wherein the neck retention tabs 338 are compressed inward during insertion into the housing sleeve 314 and then spring open to create an abutment or potential abutment with the retention ridge 317 of the housing sleeve 314.

After securement of the adjuster gear screw 312 to the housing sleeve 314, the adjuster shaft 326 can be coupled to the reflector 106 (FIG. 49), such as by a threaded engagement with the socket assembly 116, or another coupling mechanism. Adjustment of the reflector 106 via the adjuster mechanism 308 occurs via rotation of either the adjuster tool 102 interfaced with the gear 134 on the outside of the housing 304, or engagement of a tool with the engagement interface 351. Rotation of the adjuster gear screw 312 in this manner causes the reflector 106 to pivot outward in a first direction and an opposite rotation of the adjuster gear screw 312 causes the reflector 106 to pivot inward in a second opposite direction.

As noted, the adjuster gear screw 312 is configured to provide clutching to prevent damage to various components. More particularly, rotating the adjuster gear screw 312 after the socket assembly 116 has reached either end of the threads 336 (extending between the neck 328 and the shaft end 332) on the adjuster shaft 326, or after the reflector 106 has reached an abutment while translating in either direction, can damage one or more components, rending the adjuster mechanism 308 non-operational. To prevent or substantially limit such damage, the clutch slot 343 is provided to allow the clutch members 345, 347 to deflect inward (to decrease the distance D3 therebetween) when they experience excessive rotational torque about the central axis 325. This inward deflection causes the external threads 348 to at least partially disengage from, and then slip over, the internal threads 307 of the shank portion 339, thereby allow the gear head 330 to rotate independent of the adjuster shaft 326. The size and shape of the clutch slot 343 can be varied to accommodate desired torque/strength requirements. For example, the clutch slot 343 can be increased in size, such as by widening or lengthening, to decrease the tolerated over-torque value, and likewise decreased in size to increase the tolerated over-torque value. Various shapes and sizes of the clutch slot 343 can be utilized in this manner to establish a predetermined over-torque value tolerance.

The specific materials, shapes, and sizes of components can vary. Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. The use of the term "plurality" in the description or claims shall be understood to include "one or more."

While the invention is particularly useful in automotive lamp assemblies, other applications are possible and references to use in a lamp assembly should not be deemed to limit the application of the present invention. Rather, the present invention may be advantageously adapted for use where similar performance capabilities and characteristics are desired, and that such modifications may be made by one of skill in the art of the invention without departing from the spirit or intent of the invention and therefore, the invention is to be taken as including all reasonable equivalents to the subject matter.

What is claimed is:

1. An adjuster gear screw comprising:
   an adjuster shaft having a threaded portion and a shaft end;
   a gear head having a plurality of radial protrusions spaced by a plurality of radial indents, and a flange having a flange front surface, and a clutch portion having a plurality of clutch members and a clutch slot;
   an elongated neck interconnecting the adjuster shaft and the gear head, wherein the elongated neck includes a shank portion with a cavity therein, and the gear head includes a nose that interfaces with the cavity; and
   a gear having a gear rear surface, a plurality of teeth positioned along an outer circumference, and a plurality of fingers and a plurality of notches extending along an inner circumference;
   wherein the gear is axially secured to the gear head in a first longitudinal direction via abutment of the gear rear surface with the flange front surface, and in a second longitudinal direction via engagement of the plurality of fingers with the plurality of indents, and wherein the gear is rotationally secured to the gear head via abutment of the plurality of radial protrusions with the plurality of notches.

2. The adjuster gear screw of claim 1, wherein the elongated neck includes at least two opposed neck retention tabs.

3. The adjuster gear screw of claim 2, wherein the shaft end includes a plurality of retention arms.

4. The adjuster gear screw of claim 1, wherein the nose includes a plurality of prongs on a nose end configured for engagement with a mating end wall portion in the cavity.

5. The adjuster gear screw of claim 1, wherein the clutch members include a first clutch member and a second clutch member, and wherein the clutch slot extends between the first clutch member and second clutch member.

6. The adjuster gear screw of claim 5, wherein the clutch members include a plurality of external threads.

7. The adjuster gear screw of claim 6, wherein the nose further includes an end plug having a plug end surface and a plug abutment wall, and wherein the end plug extends from the clutch portion via a collar.

8. The adjuster gear screw of claim 7, wherein the cavity includes a plurality of head retention tabs and a plurality of internal threads to matingly engage the external threads of the clutch members.

9. The adjuster gear screw of claim 8, wherein the head retention tabs flex outward to allow passage of the end plug during insertion of the nose into the cavity, and after insertion, axially secure the end plug within the cavity via abutment of the head retention tabs with the plug abutment wall, while allowing the nose to rotate within the cavity.

10. The adjuster gear screw of claim 9, wherein the gear head further includes an engagement interface engageable with an adjuster tool, and wherein the gear head is rotatable via engagement of the adjuster tool with at least one of the engagement interface and the gear.

11. The adjuster gear screw of claim 10, wherein the clutch slot allows the clutch members to deflect inward to at least partially disengage the external threads from the internal threads, thereby allowing the gear head to clutch and rotate independent of the elongated neck.

12. A lamp assembly comprising:
a lamp housing;
a reflector positioned within the lamp housing on at least one pivotable connector;
a lamp positioned on the reflector within the lamp housing; and
an adjuster gear screw coupled to the lamp housing and operably engaged to the reflector such that rotation of the gear screw pivots the reflector;
wherein the adjuster gear screw comprises:
an adjuster shaft having a threaded portion and a shaft end;
a gear head having a plurality of radial protrusions spaced by a plurality of radial indents, and a flange having a flange front surface, and a nose having a clutch portion that includes a plurality of externally threaded clutch members and a clutch slot, wherein the nose further includes an end plug having a plug end surface and a plug abutment wall, and wherein the end plug extends from the clutch portion via a collar;
an elongated neck interconnecting the adjuster shaft and the gear head; and
a gear having a gear rear surface, a plurality of teeth positioned along an outer circumference, and a plurality of fingers and a plurality of notches extending along an inner circumference;
wherein the gear is axially secured to the gear head in a first longitudinal direction via an abutment of the gear rear surface with the flange front surface, and in a second longitudinal direction via engagement of the plurality of fingers with the plurality of indents, and wherein the gear is rotationally secured to the gear head via abutment of the plurality of radial protrusions with the plurality of notches.

13. The lamp assembly of claim 12, wherein the elongated neck includes a shank portion with a cavity therein and wherein the cavity includes a plurality of head retention tabs and a plurality of internal threads that matingly engage the external threads of the clutch members, and wherein the head retention tabs flex outward to allow passage of the end plug during insertion of the nose into the cavity, and after insertion, axially secure the end plug within the cavity via abutment of the head retention tabs with the plug abutment wall, while allowing the nose to rotate within the cavity.

14. The lamp assembly of claim 13, wherein the clutch slot allows the clutch members to deflect inward to at least partially disengage the external threads from the internal threads, thereby allowing the gear head to clutch and rotate independent of the elongated neck.

15. The lamp assembly of claim 14, wherein the lamp housing further includes a housing sleeve at least one of secured to or formed integrally therewith, the housing sleeve having a cylindrical passage, a retention ridge, and a tool slot, wherein the shank portion of the adjuster gear screw is axially secured inside the cylindrical passage.

* * * * *